United States Patent
Kim et al.

(10) Patent No.: US 10,938,243 B2
(45) Date of Patent: Mar. 2, 2021

(54) POWER TRANSMISSION APPARATUS AND POWER TRANSMISSION METHOD

(71) Applicant: Samsung Electronics Co., Ltd., Gyeonggi-do (KR)

(72) Inventors: Dong Zo Kim, Gyeonggi-do (KR); Kyoung Won Kim, Seoul (KR); Han Seok Park, Seoul (KR); Se Ho Park, Gyeonggi-do (KR); Yu Su Kim, Gyeonggi-do (KR); Keum Su Song, Seoul (KR); Ju Hyang Lee, Gyeonggi-do (KR); Hyung Koo Chung, Gyeonggi-do (KR); Kyung Min Park, Gyeonggi-do (KR); Yong Sang Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 16/328,361

(22) PCT Filed: Aug. 22, 2017

(86) PCT No.: PCT/KR2017/009172
§ 371 (c)(1),
(2) Date: Feb. 26, 2019

(87) PCT Pub. No.: WO2018/043981
PCT Pub. Date: Mar. 8, 2018

(65) Prior Publication Data
US 2019/0379241 A1    Dec. 12, 2019

(30) Foreign Application Priority Data

Sep. 1, 2016  (KR) .................. 10-2016-0112873

(51) Int. Cl.
*H01F 27/42* (2006.01)
*H01F 37/00* (2006.01)
(Continued)

(52) U.S. Cl.
CPC .............. *H02J 50/12* (2016.02); *H02J 7/025* (2013.01); *H04B 5/0037* (2013.01); *H04B 5/0081* (2013.01)

(58) Field of Classification Search
CPC ........ H02J 50/12; H02J 7/025; H02J 7/00034; H02J 50/10; H02J 50/70; H02J 50/80;
(Continued)

(56) References Cited

U.S. PATENT DOCUMENTS 6,664,770 B1    12/2003   Bartels
8,922,162 B2    12/2014   Park et al.
(Continued)

FOREIGN PATENT DOCUMENTS

KR    10-2012-0085498 A    8/2012
KR    10-2013-0016588 A    2/2013
(Continued)

OTHER PUBLICATIONS

European Search Report dated Jul. 11, 2019.

*Primary Examiner* — Rexford N Barnie
*Assistant Examiner* — Rasem Mourad
(74) *Attorney, Agent, or Firm* — Cha & Reiter, LLC.

(57) ABSTRACT

A power transmitting unit is provided. The power transmitting unit includes a signal generator configured to generate a signal of a first frequency band for wireless charging, a power generation circuit configured to generate a modulation signal for modulating the signal of the first frequency band generated by the signal generator, and amplify a transmit power of the signal of the first frequency band based on voltage supplied from the outside of the power
(Continued)

transmitting unit, a power transmission circuit configured to transmit the amplified transmit power to a power receiving unit via a first antenna, a second antenna configured to receive information about a charging state from the power receiving unit through a second frequency band, and a control circuit configured to control a duty and frequency of the modulation signal based on the charging state.

14 Claims, 19 Drawing Sheets

(51) Int. Cl.
*H01F 38/00* (2006.01)
*H02J 50/12* (2016.01)
*H02J 7/02* (2016.01)
*H04B 5/00* (2006.01)

(58) Field of Classification Search
CPC .......... H02J 7/02; H02J 50/20; H04B 5/0037; H04B 5/0081; H02M 1/14
See application file for complete search history.

(56) References Cited

U.S. PATENT DOCUMENTS

| | | | |
|---|---|---|---|
| 9,225,176 B2 | 12/2015 | Choi et al. | |
| 9,246,352 B2 | 1/2016 | Park et al. | |
| 9,438,063 B2 | 9/2016 | Lin et al. | |
| 9,505,315 B2 | 11/2016 | Garcia Briz et al. | |
| 9,787,105 B2 | 10/2017 | Choi et al. | |
| 9,985,478 B2 | 5/2018 | Park et al. | |
| 2006/0091136 A1* | 5/2006 | Weiss | H05B 6/101 219/666 |
| 2006/0199620 A1 | 9/2006 | Greene et al. | |
| 2007/0156204 A1* | 7/2007 | Denker | A61N 1/3787 607/61 |
| 2009/0174263 A1* | 7/2009 | Baarman | H02J 50/12 307/104 |
| 2012/0235507 A1* | 9/2012 | Choi | H02J 50/12 307/104 |
| 2012/0300875 A1* | 11/2012 | Kwon | H04L 25/0384 375/295 |
| 2013/0038278 A1 | 2/2013 | Park et al. | |
| 2013/0175937 A1* | 7/2013 | Nakajo | H02J 50/40 315/200 R |
| 2014/0103870 A1* | 4/2014 | Baarman | H02J 5/005 320/108 |
| 2014/0152251 A1* | 6/2014 | Kim | H02J 50/80 320/108 |
| 2014/0217955 A1 | 8/2014 | Lin et al. | |
| 2015/0091524 A1 | 4/2015 | Park et al. | |
| 2016/0031332 A1 | 2/2016 | Garcia Briz et al. | |
| 2016/0134130 A1 | 5/2016 | Choi et al. | |
| 2016/0142110 A1 | 5/2016 | Park et al. | |
| 2018/0219417 A1 | 8/2018 | Park et al. | |

FOREIGN PATENT DOCUMENTS

| | | |
|---|---|---|
| KR | 10-1373769 B | 3/2014 |
| WO | 2013/172530 A1 | 11/2013 |

* cited by examiner

POWER TRANSMISSION APPARATUS AND POWER TRANSMISSION METHOD

CLAIM OF PRIORITY

This application is a National Phase Entry of PCT International Application No. PCT/KR2017/009172, which was filed on Aug. 22, 2017 and claims a priority to Korean Patent Application No. 10-2016-0112873, which was filed on Sep. 1, 2016, the contents of which are incorporated herein by reference.

TECHNICAL FIELD

The disclosure relates to wireless charging technologies.

BACKGROUND ART

Recently, wireless charging technologies using electromagnetic induction or magnetic resonance have come into wide use on the basis of electronic devices such as smartphones. When a power transmitting unit (PTU) (e.g., a wireless charging pad) and a power receiving unit (PRU) (e.g., a smartphone) are accessed within a distance, a battery of the power receiving unit may be charged by an electromagnetic resonance phenomenon between a transmit coil of the power transmitting unit and a receive coil of the power receiving unit.

The power transmitting unit should control an output power in a variable manner depending on a power level required by the power receiving unit. In general, the power transmitting unit may adjust a DC voltage supplied to a power amplifier to control an output power. For example, the power transmitting unit may adjust the DC voltage supplied to the power amplifier using a DC/DC converter or a switching mode power supply (SMPS). In addition, the power transmitting unit may control an output voltage using a signal modulation circuit such as pulse width modulation (PWM) rather than the DC/DC converter.

DISCLOSURE

Technical Problem

However, an output power is controlled using a modulation circuit such as PWM, a charging voltage (e.g., Vrec) of a power receiving unit may fluctuate by a frequency and a duration or duty of a modulation signal generated by the PWM. For example, when the duty of the modulation signal is decreased (i.e., when an output voltage is increased), a ripple phenomenon of a charging voltage may occur.

An aspect of the disclosure is to provide an apparatus and method for addressing the above-mentioned problems and/or purposes disclosed in the disclosure.

Technical Solution

In accordance with an aspect of the disclosure, a power transmitting unit is provided. The power transmitting unit may include a signal generator configured to generate a signal of a first frequency band for wireless charging, a power generation circuit configured to generate a modulation signal for modulating the signal of the first frequency band generated by the signal generator, and amplify a transmit power of the signal of the first frequency band based on voltage supplied from the outside of the power transmitting unit, a power transmission circuit configured to transmit the amplified transmit power to a power receiving unit via a first antenna, a second antenna configured to receive information about a charging state from the power receiving unit through a second frequency band, and a control circuit configured to control a duty and frequency of the modulation signal based on the charging state.

In accordance with another aspect of the disclosure, a power transmitting method in a power transmitting unit is provided. The method may include generating a signal of a first frequency band for wireless charging, generating a modulation signal for modulating the signal of the first frequency band, amplifying a transmit power of the signal of the first frequency band based on a constant voltage supplied from the outside of the power transmitting unit, transmitting the amplified transmit power to a power receiving unit, receiving information about a charging state from the power receiving unit, and controlling a duty and frequency of the modulation signal based on the charging state.

In accordance with another aspect of the disclosure, a power transmitting unit is provided. The power transmitting unit may include a variable power generation unit configured to output a variable power by modulating a high-frequency signal having a constant amplitude on a time axis through repetition of the on/off of the high-frequency signal and a power amplifier configured to amplify the variable power to a power level required by a power receiving unit based on a constant voltage. The variable power generation unit may include a modulation circuit configured to generate a low-frequency modulation signal. The on/off of the high-frequency signal may be controlled by a duty of the modulation signal. A duty of the low-frequency modulation signal may be determined based on the required power of the power receiving unit. A frequency of the low-frequency modulation signal may be determined based on a charging state of the power receiving unit.

Advantageous Effects

According to various embodiments disclosed in the disclosure, the efficiency of a wireless charging system may be increased. Furthermore, a power transmitting unit may be heated. Furthermore, a power receiving unit may minimize the occurrence of an unstable charging state (e.g., a ripple phenomenon of a charging voltage).

Furthermore, according to an embodiment, when wireless charging is started, a phenomenon which fails in initial charging may be prevented. Furthermore, according to another embodiment, it may be prevented that another system (e.g., NFC) influenced by the wireless charging system is broken.

In addition, various effects directly or indirectly ascertained through the present disclosure may be provided.

MODE FOR INVENTION

Figure 1A:
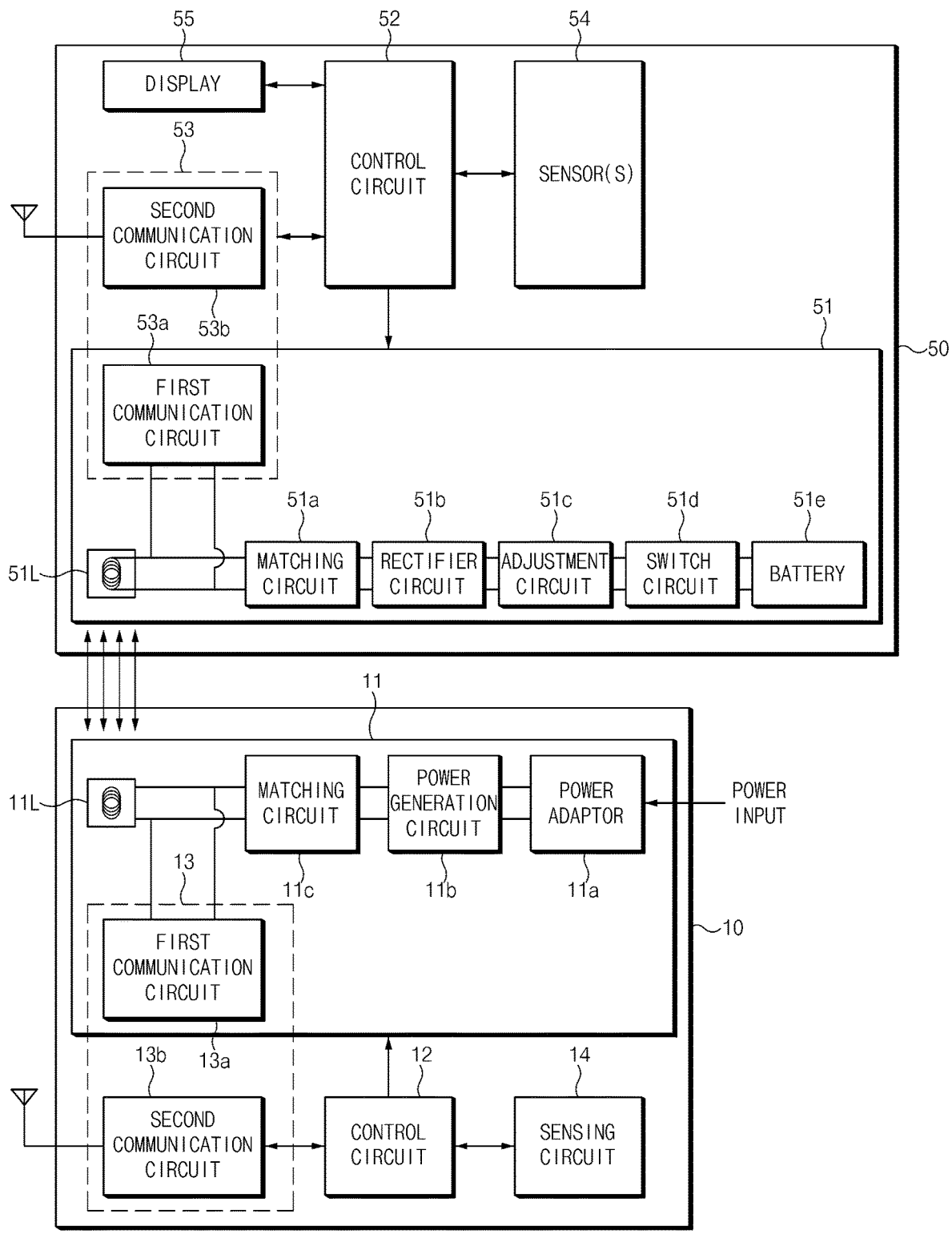
FIG. 1A illustrates a wireless charging environment according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1A illustrates a wireless charging environment according to an embodiment.

Referring to FIG. 1A, a wireless power transmitting unit 10 may supply power to a wireless power receiving unit 50. In the disclosure, the wireless power transmitting unit 10 may be simply referred to as a power transmitting unit or a PTU. Furthermore, the wireless power receiving unit 50 may be simply referred to as a power receiving unit or a PRU. The power transmitting unit 10 may be connected with a TA 10 or a random power source to supply power to the power receiving unit 50.

In an embodiment, the power receiving unit 50 may correspond to a user terminal such as a smartphone. However, in various embodiments, the power receiving unit 50 may be understood as an electronic device which supports wireless charging.

In an embodiment, the power transmitting unit 10 may correspond to a wireless charging pad for smartphone. However, in various embodiments, the power transmitting unit 10 may be understood as an electronic device capable of wirelessly supplying power to the power receiving unit 50.

Referring to FIG. 1A, the power transmitting unit 10 may include a power generation circuit 11, a control circuit 12, a communication circuit 13, and a sensing circuit 14.

The power generation circuit 11 may include a power adaptor 11a for receiving power from the outside and suitably converting a voltage of the input power, a power generation circuit 11b for generating power, and a matching circuit 11c for maximizing efficiency between a transmit coil 11L and a receive coil 51L.

The control circuit 12 may perform overall control of the power transmitting unit 10 and may generate various messages necessary for wireless power transmission to deliver the generated messages to the communication circuit 13. Furthermore, the control circuit 12 may calculate an amount of power to be transmitted to the power receiving unit 50, based on information received from the communication circuit 13. Moreover, the control circuit 12 may control the power generation circuit 13 such that power calculated by the transmit coil 11L is transmitted to the power receiving unit 50.

The communication circuit 13 may include at least one of a first communication circuit 13a and a second communication circuit 13b. The first communication circuit 13a may communicate with a first communication circuit 53a of the power receiving unit 50 using the transmit coil 11L used for power transmission (e.g., an inband manner). The second communication circuit 13b may communicate with, for example, a second communication circuit 53b of the power receiving unit 50 using an antenna or coil different from the transmit coil 11L used for power transmission (e.g., an outband manner). For example, the second communication circuit 13b may obtain information (e.g., Vrec information, Iout information, various packets, a message, or the like) associated with a charging state from the second communication circuit 53b using any one of various short-range communication modes, such as Bluetooth, BLE, Wi-Fi, and NFC.

In addition, the power transmitting unit may further include a sensing circuit 14 or the like for sensing a temperature, motion, or the like of the power transmitting unit.

The power receiving unit 50 may include a power receiving circuit 51, a control circuit 52, a communication circuit 53, at least one sensor 54, and a display 55. In the power receiving unit 50, the description of the configuration corresponding to the power transmitting unit 10 will be partially omitted.

The power receiving circuit 51 may include the receive coil 51L for wirelessly receiving power from the power transmitting unit 10, a matching circuit 51a, a rectifier circuit 51b for rectifying the received AC power into DC, an adjustment circuit 51c for adjusting a charging voltage, a switch circuit 51d, and a battery 51e.

The control circuit 52 may perform overall control of the power receiving unit 50 and may generate various messages necessary for wireless power transmission to deliver the generated messages to the communication circuit 53.

The communication circuit 53 may include at least one of the first communication circuit 53a and the second communication circuit 53b. The first communication circuit 53a may communicate with the power transmitting unit 10 through the receive coil 51L. The second communication circuit 53b may communicate with the power transmitting unit 10 using any one of various short-range communication modes, such as Bluetooth, BLE, Wi-Fi, and NFC.

In addition, the power receiving unit 50 may further include the at least one sensor 54, such as a current/voltage sensor, a temperature sensor, an illumination sensor, and a sound sensor, and the display 55.

Figure 1B:
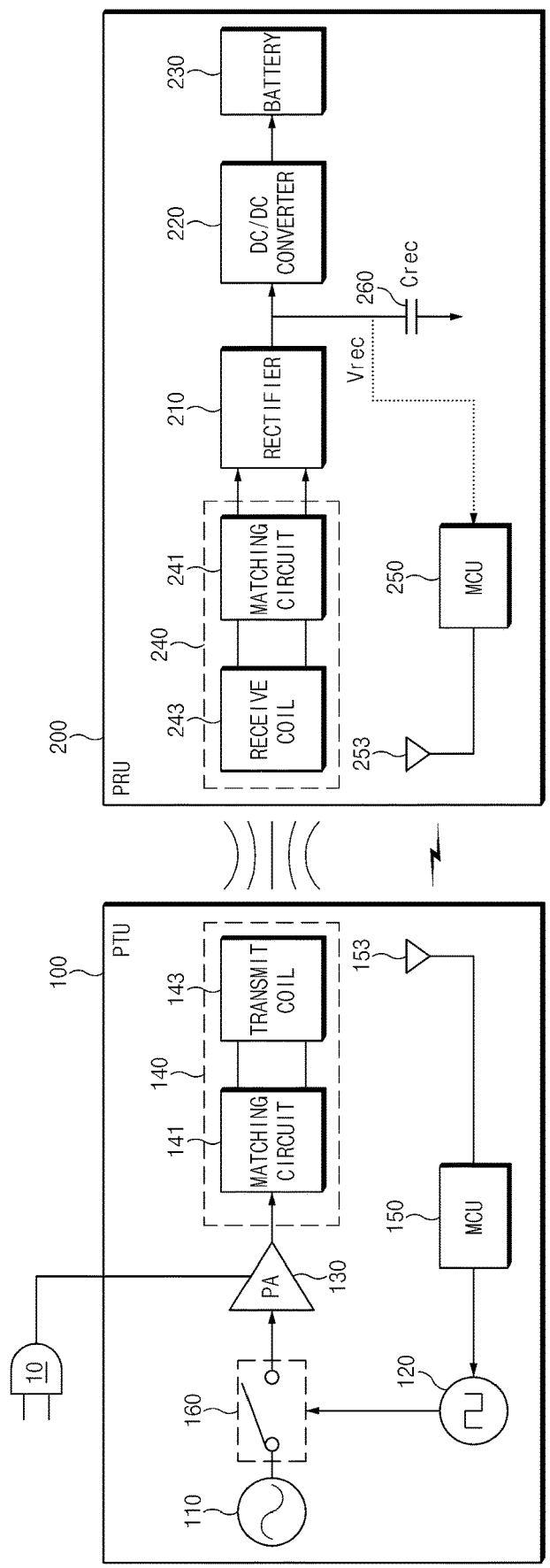
FIG. 1B illustrates a wireless charging environment according to another embodiment.

FIG. 1B illustrates a wireless charging environment according to another embodiment. For example, FIG. 1B may be understood as an example of a wireless charging environment of FIG. 1A, conceptually illustrated for convenience of description. In the disclosure, a description will be given of a configuration of FIG. 1B. However, it is obvious to those skilled in the art that the description with reference to FIG. 1B is applicable to the wireless charging environment of FIG. 1A.

Referring to FIG. 1B, in an embodiment, a power transmitting unit 100 may include a signal generator 110, a modulation circuit 120, a power amplifier (PA) 130, a power transmitting circuit 140, a control circuit 150 (e.g., a micro processing unit (MCU)), and a switch 160. The power transmitting unit 100 may include an additional component which is obvious to those skilled in the art other than the illustrated components. For example, the power transmitting unit 100 may further include a power supply interface (e.g., a connector) between a TA 10 and the power transmitting unit 100 and/or a display or LED indicating a charging state.

The signal generator 110 may generate a signal of a first frequency band for resonant wireless charging. For example, the signal generator 110 may generate a signal having a frequency of 6.78 MHz defined in AW4P. In the disclosure, a signal generated by the signal generator 110 may be referred to as a "power signal".

The modulation circuit 120 may generate a modulation signal for modulating the signal generated by the signal generator 110. In an embodiment, the modulation circuit 120 may correspond to a pulse width modulation (PWM) module which modulates an amplitude of a power signal generated by the signal generator 110. The modulation signal may have a constant duty cycle and frequency. For example, when a duty of the modulation signal is 50%, one half of one period may correspond to a high state and the other may correspond to a low state. An amount of power supplied to the power amplifier 130 may be controlled according to the duty of the modulation signal.

The signal generator 110, the modulation circuit 120, and the switch 160 may be referred to as a "variable power generation unit". The variable power generation unit may modulate a high-frequency signal of a constant amplitude, generated by the signal generator 110, about a time axis. For example, the variable power generation unit may generate a variable power by modulating the high-frequency signal through repetition of the on/off of the switch 160. In this case, an on/off duration of the switch 160 may be determined by a modulation signal generated by the modulation circuit 120.

The power amplifier 130 may receive the power signal (modulated by the modulation signal) and may amplify the power signal to a constant power. The power amplifier 130 may receive voltage Vdd from the TA 10 connected with the power transmitting unit 100. The constant voltage may correspond to a DC voltage into which an AC voltage supplied from the TA 10 is rectified. The power amplifier 130 may amplify a power signal input thereto to a power level required by a power receiving unit 200, based on the voltage Vdd.

The power transmitting circuit 140 may include a matching circuit 141 and a transmit coil 143. The matching circuit 141 may be configured with impedance matching elements for increasing resonance efficiency between the transmit coil 143 of the power transmitting unit 100 and a receive coil 243 of the power receiving unit 200. The transmit coil 143 may be implemented with a conductive material for power transmission. Thus, the transmit coil 143 may be referred to as a first antenna or a first antenna radiator.

The control circuit 150 may control several components of the power transmitting unit 100. In an embodiment, the control circuit 150 may correspond to at least a portion of a communication module for processing a communication function, which receives information about a charging state from the power receiving unit 200. For example, the control circuit 150 may be a portion of a Bluetooth or Bluetooth low energy (BLE) communication module which receives information about a communication state from the power receiving unit 200 via a second antenna 153.

In an embodiment, a plurality of control circuits may be included in the power transmitting unit 100. For example, the control circuit 150 may process information about a charging state of the wireless power receiving unit 200, received via the second antenna 153, and another control circuit (not shown) may control the signal generator 110, the modulation circuit 120, or the like. In the disclosure, for convenience of description, the description assumes that the control circuit 150 controls an overall operation of the power transmitting unit 100.

The switch 160 may be located between the signal generator 110 and the power amplifier 130 and may operate according to a modulation signal. For example, when the modulation signal is in a high state, the switch 160 may be short-circuited. In this case, a signal generated by the signal generator 110 is delivered to the power amplifier 130 without change. When the modulation signal is a low state, the switch 160 may be opened. In this case, a signal generated by the signal generator 110 is not delivered to the power amplifier 130.

The switch 160 may be implemented as a switch circuit including a logic circuit (an AND gate or the like). Thus, the switch 160 may be short-circuited/opened to be the same as a frequency of the modulation signal. For example, when the modulation signal has a frequency of 100 kHz, the switch 160 may be short-circuited/opened at intervals of 10 µs. The short-circuiting of the switch 160 may be referred to as the switch on, and the opening of the switch 160 may be referred to as the switch off.

In an embodiment, the second antenna 153 may communicate with the power receiving unit 200 using a signal of a second frequency band distinguished from a first frequency band. For example, the second antenna 153 may transmit/receive a Bluetooth or BLE signal having a frequency of 2.4 GHz. In the disclosure, the signal of the second frequency band, exchanged between the power transmitting unit 100 and the power receiving unit 200, may be referred to as a "communication signal".

The power receiving unit 200 according to an embodiment may include a rectifier 210, a DC/DC converter 220, a battery 230, a power receiving circuit 240, and a control circuit 250. The power receiving unit 200 shown in FIG. 1 may include only the components necessary to describe a process of receiving power from the power transmitting unit 100 and charging the battery 230, but may further include another module (e.g., a display, a touch sensor, a camera, a speaker, a microphone, or the like) for performing a common function of the power receiving unit 200 other than the shown components.

The power receiving unit 240 may supply power obtained through a receive coil 243 to the rectifier 210. A matching circuit 241 may be implemented with impedance matching elements for optimizing resonance efficiency between the receive coil 243 and the transmit coil 143.

The rectifier 210 may convert an AC power obtained by the power receiving circuit 240 into a DC power. The converted DC power may be supplied to the DC/DC converter 220. The DC/DC converter 220 may convert voltage having a DC power into a suitable voltage and may supply the converted voltage to the battery 230.

The power receiving unit 200 according to an embodiment may provide information about a charging state of the battery 230 to the power transmitting unit 100. For example, the power receiving unit 200 may sense a voltage Vrec of a rectifier capacitor Crec of the rectifier 210. The control circuit 250 may provide the sensed Vrec value to the power receiving unit 100 via a second antenna 253. The power transmitting unit 100 may control a modulation signal to continue charging at optimal efficiency based on a charging state (e.g., a Vrec value or a change in the Vrec value) of the battery 230 of the power receiving unit 200.

The power transmitting unit 100 and the power receiving unit 200 shown in FIG. 1B may be understood as an example of a charging system which supports resonant wireless charging. However, in the same another embodiment as that in FIG. 1A, the technical scope about the control of the modulation signal disclosed in the disclosure is applicable to another charging system such as inductive wireless charging (e.g., WPC) or electromagnetic wireless charging.

Figure 1C:
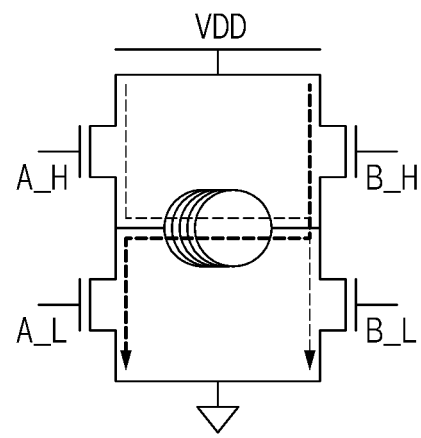
FIG. 1C illustrates a configuration of a bridge circuit according to an embodiment.

FIG. 1C illustrates a configuration of a bridge circuit according to an embodiment. The bridge circuit of FIG. 1B may be implemented as a portion of a power generation circuit 11 of a power transmitting unit 10 of FIG. 1A or may be implemented as a portion of a power generation circuit of a power transmitting unit 100 of FIG. 1B.

Referring to FIGS. 1B and 1C, for example, a signal generated by a signal generator 110 may pass through the bridge circuit of FIG. 1C. Herein, the bridge circuit may correspond to a PA 130. The bridge circuit may control to the on/off Vdd through switching. For example, a gate input (A_H, A_L, B_H, or B_L) may be controlled to correspond to operations of the signal generator 110, a modulation circuit 120, and a switch 160. For example, the gate input of the bridge circuit may be controlled such that a power signal is input and amplified based on a frequency and duty of a modulation signal generated by the modulation circuit 120.

Figure 2A:
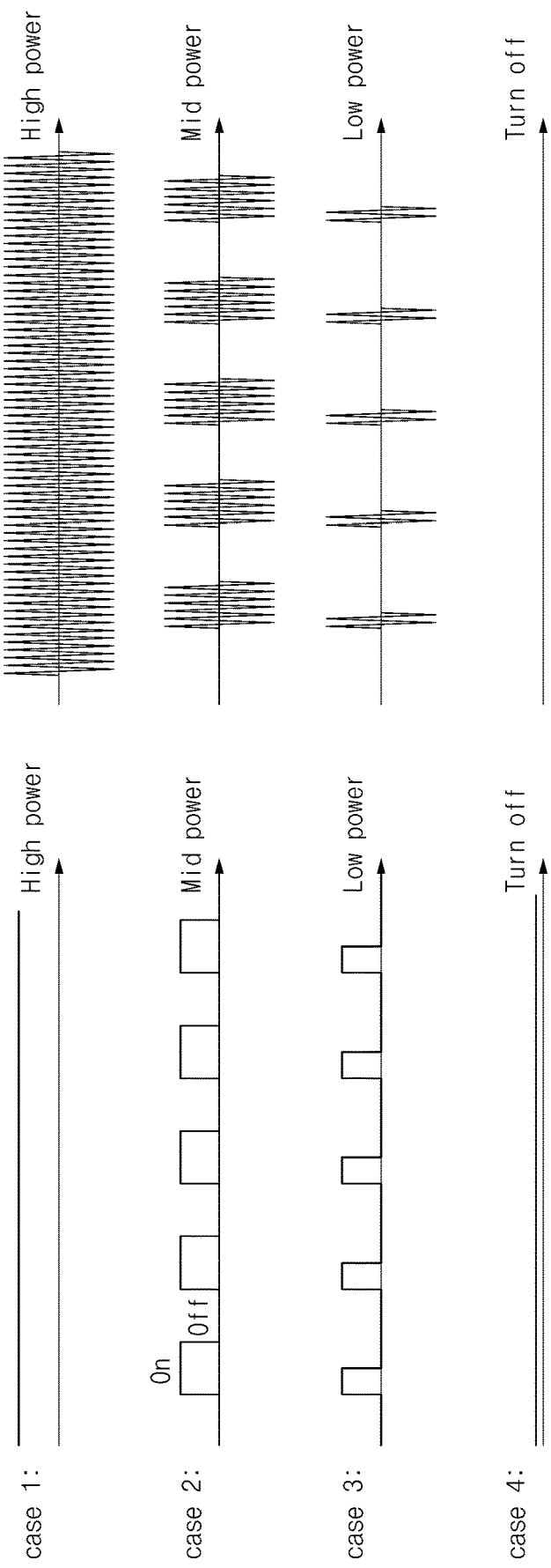
FIG. 2A illustrates an example in which a charging signal is modulated by a modulation signal according to an embodiment.

FIG. 2A illustrates an example in which a charging signal is modulated by a modulation signal according to an embodiment.

A first example (case 1) may correspond to when a maximum power is requested from a power receiving unit 200. For example, a signal generator 110 may continue generating a signal of a high frequency (e.g., a first frequency band) of a constant amplitude. In this example, because a modulation signal remains high, a high-frequency signal (a power signal) is not modulated at all and is provided to a power amplifier without change.

A second example (case 2) may correspond to when a power of a middle degree (50%) is requested from the power receiving unit 200. A modulation circuit 120 may generate a modulation signal having a duty of 50%. In this example, a high-frequency signal generated by the signal generator 110 may be provided to the power amplifier 130 while the modulation signal remains high or while a switch 160 is in an on state.

A third example (case 3) may correspond to when a low power is requested from the power receiving unit 200. The modulation circuit 120 may control (generate) a modulation signal to have a lower duty than that in the second example.

A fourth example (case 4) may correspond to when power is not requested from the power receiving unit 200 (e.g., when charging is completed). In this case, because a modulation signal remains low, a high-frequency signal generated by the signal generator 110 is not provided to the power amplifier 130. Herein, in this case, the power transmitting unit 100 may stop the operation of the signal generator 110 or the like.

Figure 2B:
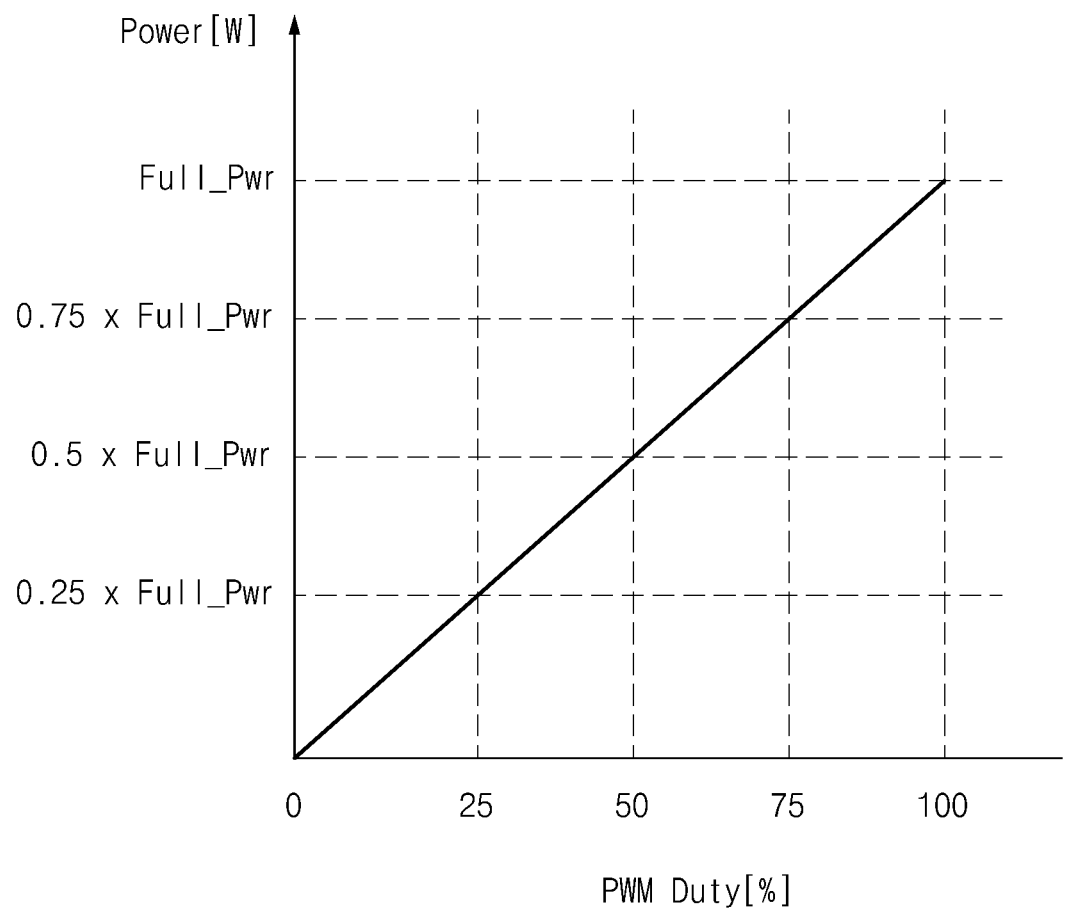
FIG. 2B is a graph illustrating a relationship between a duty of a modulation signal and a charging power according to an embodiment.

FIG. 2B is a graph illustrating a relationship between a duty of a modulation signal and a charging power according to an embodiment.

Referring to FIG. 2B, a duty of a modulation signal generated by a modulation circuit 120 (e.g., a PWM module) and power output from a power amplifier 130 may be proportional to each other. Thus, a power transmitting unit 100 may control a rate at which the modulation signal remains high, during the duty of the modulation signal, that is, one period of the modulation signal to control an output power.

Figure 3A:
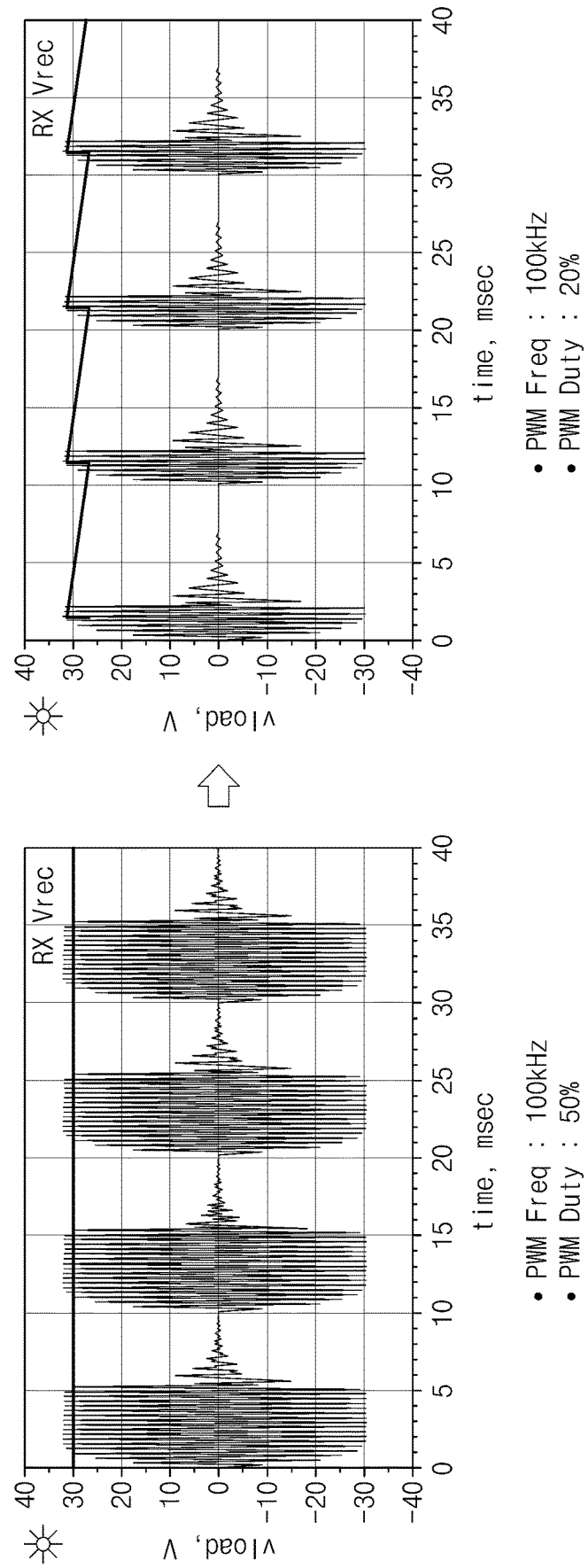
FIG. 3A illustrates a change in a charging state of an RX stage according to a change in a duty of a modulation signal according to an embodiment.

FIG. 3A illustrates a change in a charging state of an RX stage according to a change in a duty of a modulation signal according to an embodiment. Herein, the RX stage may correspond to a power receiving unit 200, and the charging state may correspond to a Vrec value.

Power supplied from a power transmitting unit 100 may be stored in a rectifier capacitor Crec in the form of a DC current by a rectifier 210 of the power receiving unit 200. The power stored in the rectifier capacitor may be used to charge a battery 230. Assuming that a frequency of a modulation signal remains constant, when a duration where a charging power is not supplied becomes long by the modulation signal, a voltage drop of the rectifier capacitor may occur. For example, as shown in the left graph of FIG. 3A, when a duty of a modulation signal having a frequency of 100 kHz is 50%, a time when power is not supplied within one period corresponds to 5 μs. When the duty of the modulation decreases to 20% in the same frequency, as shown in the right graph of FIG. 3A, a time when power is not supplied increases to 8 μs. When the time when power is not supplied becomes long, power stored in the rectifier capacitor does not maintain Vrec of a constant level, and the result is a decrease in Vrec. Vrec may repeat being recovered again at a time when power is supplied again (e.g., a next period of the modulation signal). Thus, there may occur the ripple phenomenon in which Vrec shows a cyclical reduction-recovery pattern. According to an embodiment, the power transmitting unit 100 may adjust a frequency of the modulation signal based on information about a charging state obtained through a second antenna 153. When the ripple phenomenon of Vrec is detected, the power transmitting unit 100 may control a modulation circuit 120 such that a frequency of the modulation signal increases to stably maintain a charging state of the battery 230 (i.e., to remove the ripple phenomenon). A description will be given below of an example associated with this with reference to FIG. 5.

Figure 3B:
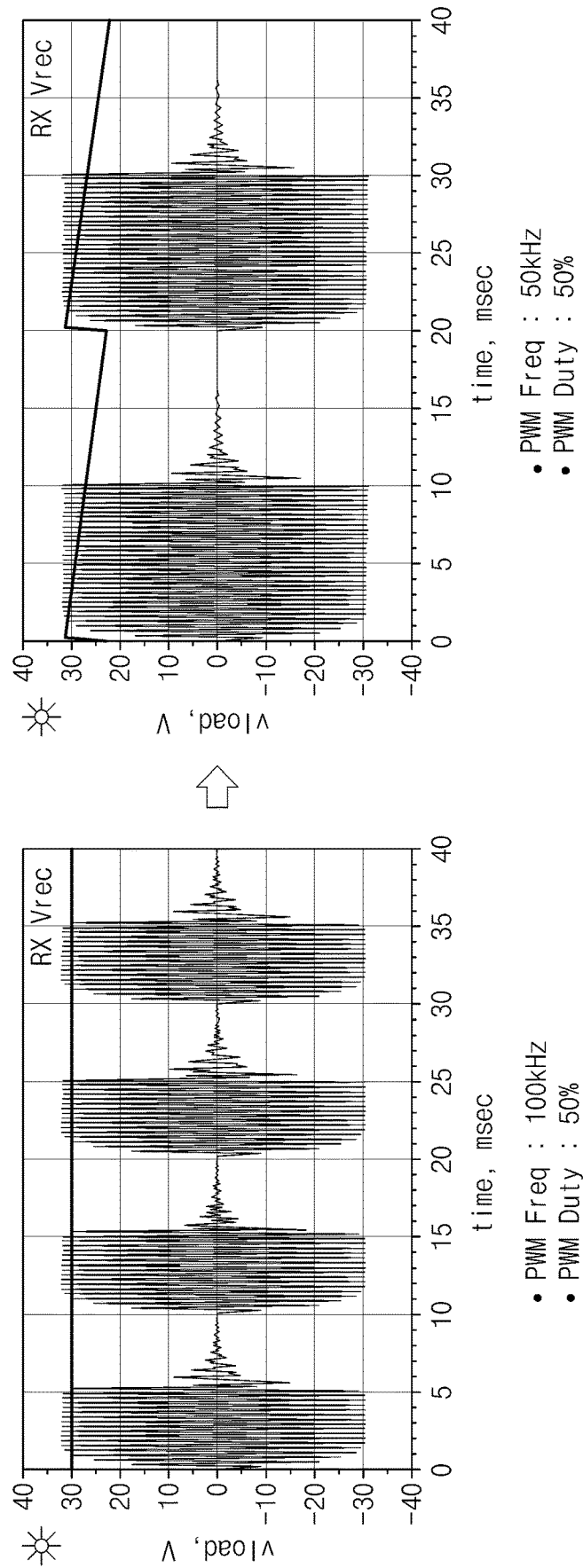
FIG. 3B illustrates a change in a charging state of an RX stage according to a change in a frequency of a modulation signal according to an embodiment.

FIG. 3B illustrates a change in a charging state of an RX stage according to a change in a frequency of a modulation signal according to an embodiment.

According to the left graph of FIG. 3B, when a modulation has a frequency of 100 kHz and a duty of 50%, the charging of a power receiving unit 200 may be stably performed. In this example, when a frequency of the modulation signal decreases to 50 kHz while the duty is kept identical, as shown in the right graph of FIG. 3B, the ripple phenomenon may occur. That is, because a time when a charging power is not supplied increases from 5 μs (left graph) to 10 μs (right graph) due to the decrease in the frequency of the modulation signal, Vrec may fail to be kept constant and may be reduced.

The change in the charging state according to the frequency and duty of the modulation signal, described with reference to FIGS. 3A and 3B, is inversely applicable. For example, in FIG. 3B, when the frequency increase from 50 kHz to 100 kHz while the duty remains 50%, the ripple phenomenon may be substantially removed. In the disclosure, that the ripple phenomenon is substantially removed may refer to decreasing a ripple to a level (e.g., less than 3%) permissible in an environment where a real terminal (e.g., the power receiving unit 200) is used. In an embodiment, the power transmitting unit 100 may determine a frequency value in which a charging state of the power receiving unit 200 is stabilized while increasing a frequency of the modulation signal gradually or stage by stage. For example, when the charging state is stabilized when the frequency of the modulation is 80 kHz, the power transmitting unit 100 may not increase the frequency of the modulation signal any longer. In this regard, a description will be given with reference to FIGS. 4A and 4B.

For reference, FIGS. 3A and 3B illustrate a pattern where the Vrec value remains constant or decreases linearly. However, this is for convenience of description, and those skilled in the art may appreciate that the Vrec value substantially remains constant when a sufficient power is supplied to the capacitor (e.g., when the duty is on). Furthermore, those skilled in the art may appreciate that the Vrec value decreases in the form of an exponential function when power is not supplied to the capacitor (e.g., when the duty is off).

Figure 4A:
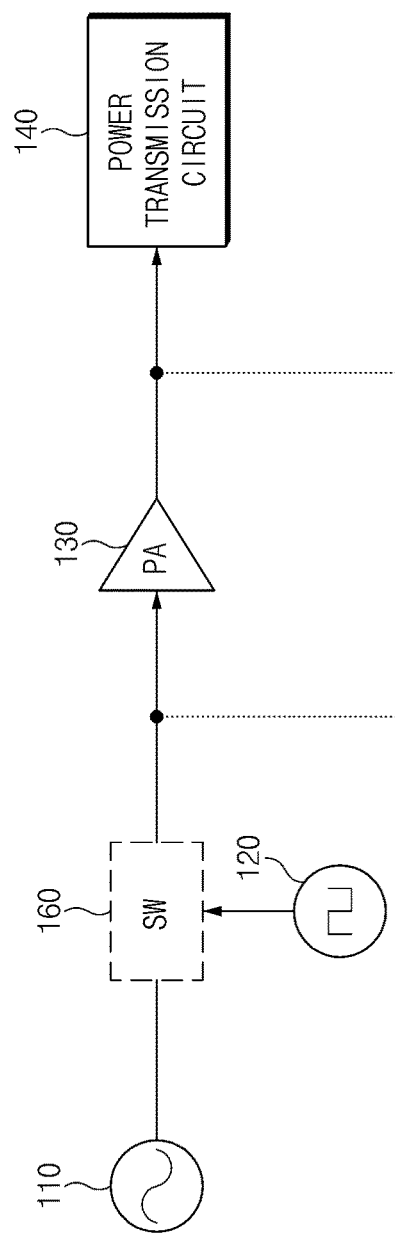
FIG. 4A illustrates a waveform of a power signal input to a power amplifier and a waveform of a power signal amplified by the power amplifier according to an embodiment.
Figure 4A:
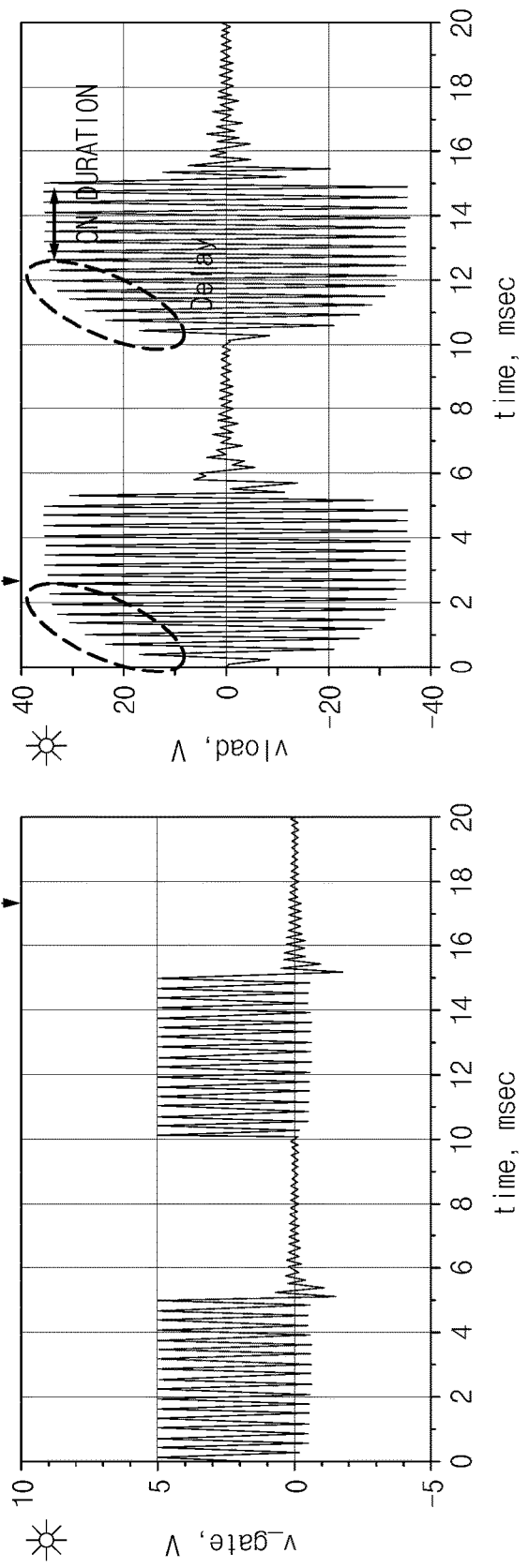

FIG. 4A illustrates a waveform of a power signal input to a power amplifier 130 and a waveform of a power signal amplified by the power amplifier 130 according to an embodiment.

Referring to FIG. 4A, a power signal generated by a signal generator 110 may be modulated by a modulation signal generated by a modulation circuit 120 to be delivered to a power amplified 130. The power signal delivered to the power amplifier 130 may have substantially the same constant amplitude while a switch 160 remains on.

Because the power amplifier 130 may include an element such as an inductor, a delay may occur until an output waveform has a form similar to an input waveform. For example, seeing an output waveform corresponding to an input waveform for the initial 5 µs in FIG. 4A, it may be seen that loss occurs at the first 2 µs. That is, whenever a power signal passes through the power amplifier 130, an initial loss may occur. Because the power signal is input to the power amplifier 130 depending on the on/off of the switch 160, the loss of the power signal may occur depending on an operating frequency of the switch 160. Because the operating frequency of the switch 160 is identical to a frequency of the modulation signal, as a result, the higher the frequency of the modulation signal, the more the loss of the power signal may be increased. Furthermore, a change in the frequency of the modulation signal may be performed in consideration of the loss of the power signal.

Figure 4B:
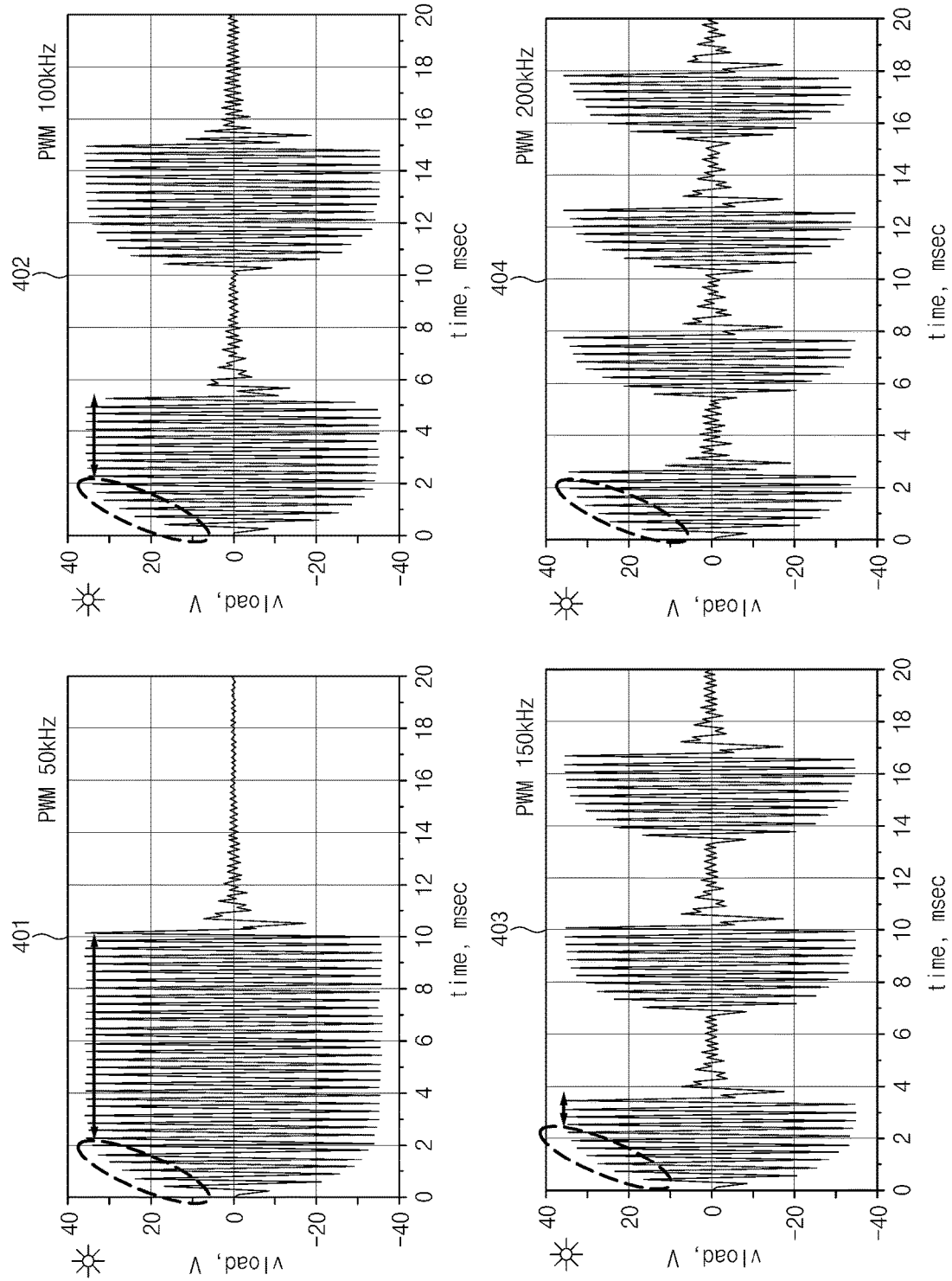
FIG. 4B illustrates a power loss of an output waveform according to a change in a frequency of a modulation signal according to an embodiment.

FIG. 4B illustrates a power loss of an output waveform according to a change in a frequency of a modulation signal according to an embodiment.

Referring to FIG. 4B, the higher the frequency of a modulation signal, the more the power loss according to a change in frequency at the same duty (50%) may be increased. For example, a time taken to reach the output voltage intended when a power signal is input to a power amplifier 130 may have a low frequency dependence. In an example of FIG. 4B, a time taken to reach the intended output voltage irrespective of frequency corresponds to about 2 µs. Thus, for a low frequency, for example, for a modulation signal having a frequency of 50 kHz, one period may be 20 µs, and an output waveform corresponding to about 8 µs of 10 µs corresponding to the switch on among 20 µs may have the intended output voltage.

However, for a modulation signal having a frequency of 100 kHz, a time indicated by an output waveform having the intended output voltage for a time of 20 µs (two periods) decreases to 6 µs. When a frequency of a modulation signal, such as 150 kHz or 200 kHz, is increased, a power loss is more increased.

In an embodiment, to minimize the power loss, a power transmitting unit 100 may generate a modulation signal such that ripple does not occur at the same duty or to have a suitable frequency or the lowest frequency in a permissible level. For example, when controlling an output power through the switching of a bridge circuit of FIG. 1B, a power transmitting unit 10 or 100 may generate a modulation signal with a suitable frequency in consideration of whether a ripple of a power receiving unit 100 maintains a stabilization state when changing a frequency of the modulation signal and/or a leakage (power loss) degree or the like which occurs when increasing the frequency of the modulation signal to enter the stabilization state when the ripple occurs. In other words, the power transmitting unit 100 may operate to determine a frequency for minimizing the power loss while stably maintaining a charging state of a battery 230, in a duty condition determined according to a power level required by the power receiving unit 200.

Figure 5:
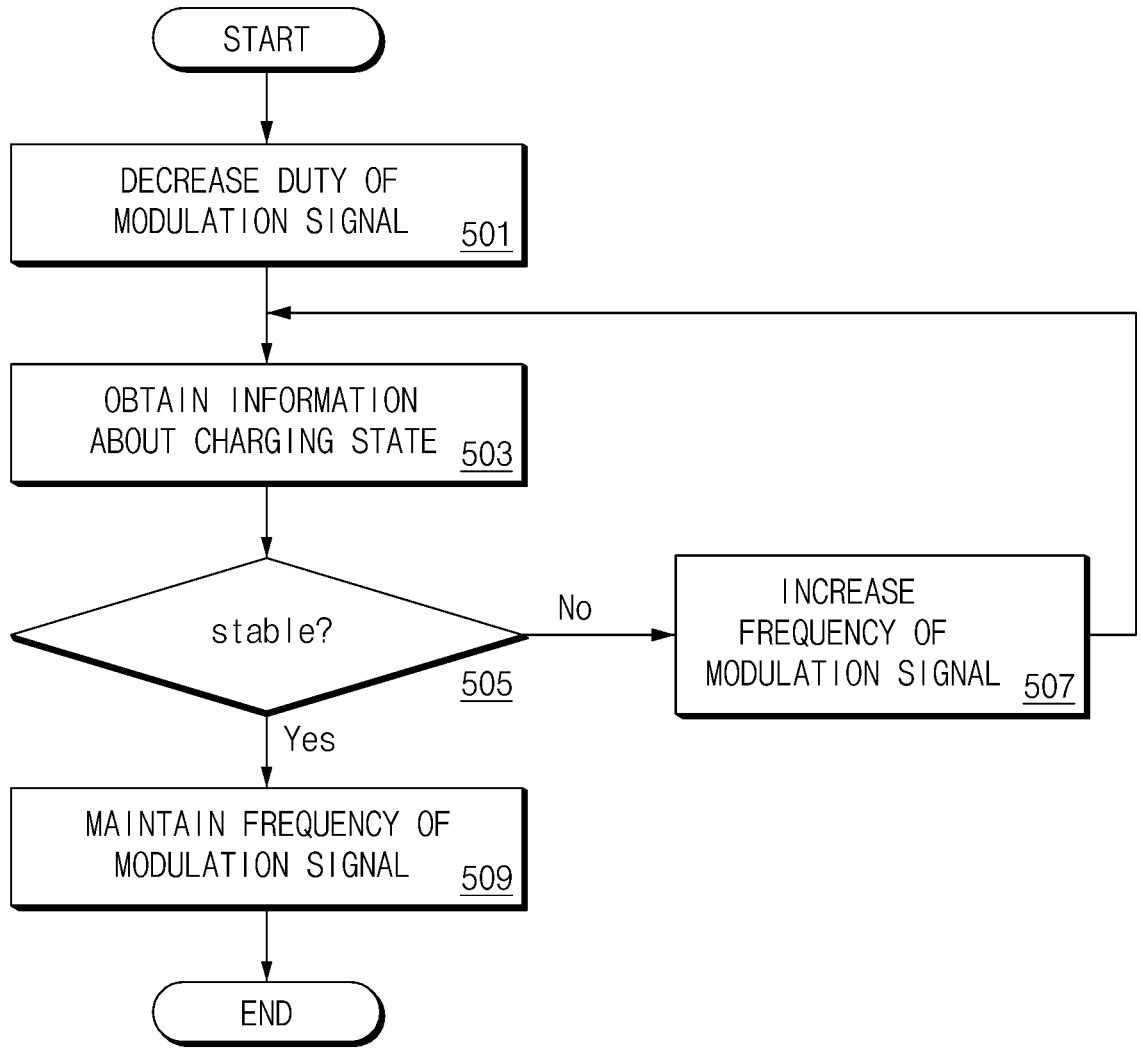
FIG. 5 illustrates a process of reducing a charging power according to an embodiment.

FIG. 5 illustrates a process of reducing a charging power according to an embodiment.

Referring to FIG. 5, in operation 501, a power transmitting unit 100 may decrease a duty of a modulation signal. For example, a modulation circuit 120 may decrease the duty of the modulation signal from 50% to 20%.

Operation 501 may be performed when the power transmitting unit 100 receives a signal for requesting to reduce a charging power from a power receiving unit 200 or recognizes that the power receiving unit 200 enters a slow or low-power charge mode. For example, the power transmitting unit 100 may receive a request to reduce a charging power from the power receiving unit 200 through an exchange of a communication signal of a second frequency band. In this case, the power transmitting unit 100 may control the modulation signal to have duty corresponding to the requested charging power.

Additionally or alternatively, the power transmitting unit 100 may determine to reduce a charging power based on a charging state received from the power receiving unit 200. For example, the power transmitting unit 100 may determine a pattern in which a Vrec value received from the power receiving unit 200 continues increasing. Based on such a Vrec pattern, the power transmitting unit 100 may determine that a supplied power is greater than the requested power to reduce a supply power.

In such an embodiment, the power transmitting unit 100 may gradually decrease the duty of the modulation signal. That is, operation 501 may include an operation of decreasing the duty of each of a plurality of modulation signals. The power transmitting unit 100 may reduce the duty of the modulation signal until a pattern in which Vrec is kept constant without continuing increasing is identified.

While operation 501 is performed, a frequency of the modulation signal may remain constant. As the duty of the modulation signal is reduced, when the result is a decrease in charging power, in operation 503, the power transmitting unit 100 may obtain information about a charging state via a second antenna 153. Operation 503 of obtaining the information about the charging state via the second antenna 153 may continue being performed over a predetermined period.

In operation 505, the power transmitting unit 100 may determine whether a charging state of a battery 230 of the power receiving unit 200 is stable. Operation 505 may be performed in response to the decrease in the duty of the modulation signal. For example, when a ripple phenomenon which departs from a permissible range occurs in a Vrec value, the control circuit 150 may determine that the charging state is unstable. When the ripple phenomenon is within the permissible range or when the ripple phenomenon does not occur, the control circuit 150 may determine that the charging state is stable.

That the charging state is unstable may mean that the ripple phenomenon occurs. In other words, that the charging state is unstable may mean that an interval where the charging power is not supplied increases due to the decrease in the duty of the modulation signal. In operation 507, the power transmitting unit 100 may increase the frequency of the modulation signal. Operations, 503, 505, and 507 may be repeated until it is determined that the charging state is stable.

When it is determined that the charging state is stable, in operation 509, the power transmitting unit 100 may maintain the frequency of the current modulation signal. It is possible to implement the optimization of charging efficiency according to control of the charging power and variance in the charging power using the modulation circuit 110 without using a DC/DC converter according to such a process.

Figure 6:
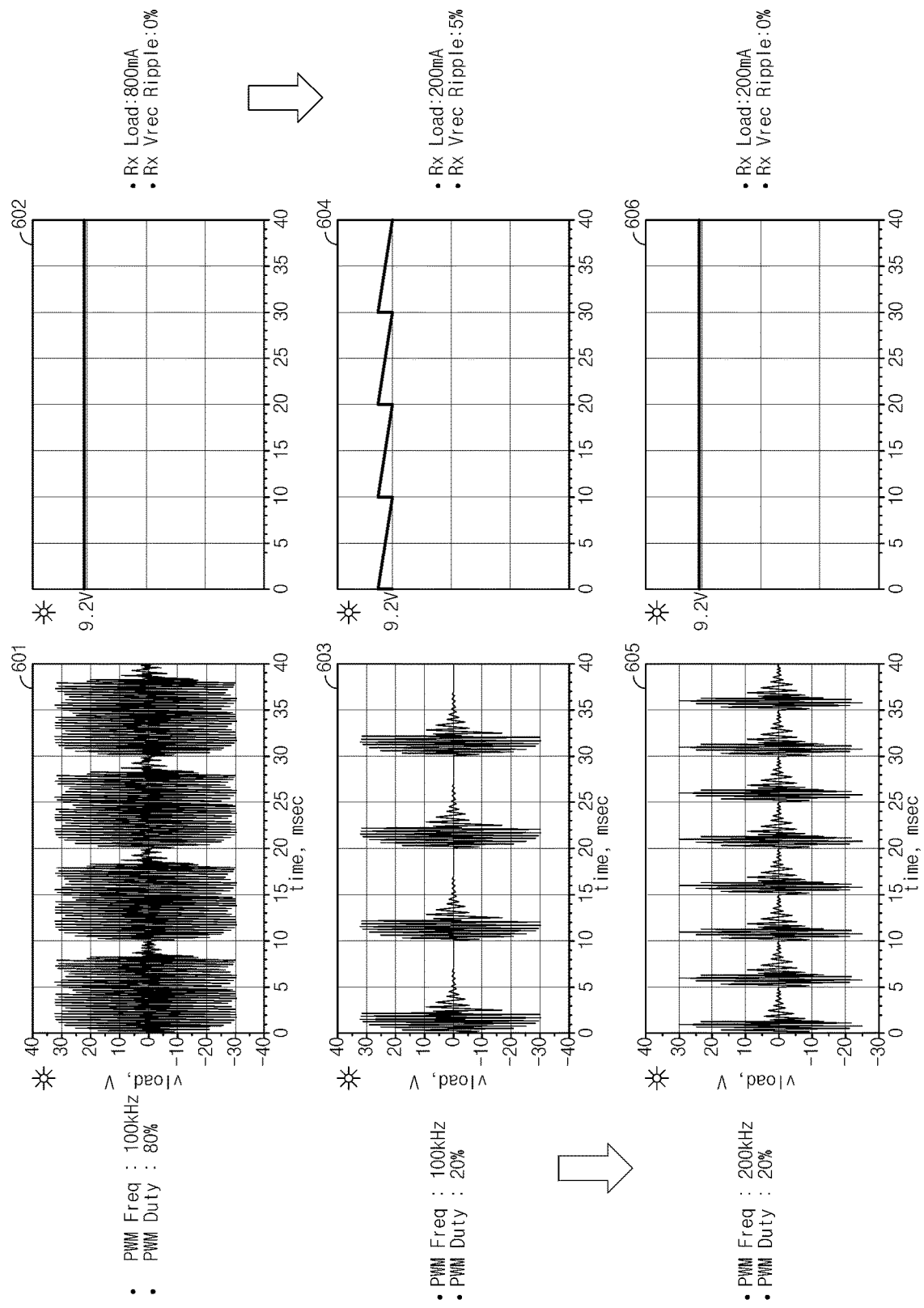
FIG. 6 illustrates a decrease in a charging power and control of a frequency of a modulation signal according to an embodiment.

FIG. 6 illustrates a decrease in a charging power and control of a frequency of a modulation signal according to an embodiment.

Referring to FIG. 6, to satisfy a charging current of 800 mA required by a power receiving unit 200, a power transmitting unit 100 may use a modulation signal with a frequency of 100 kHz and a duty of 80%. This state may be understood as a kind of fast charge mode. An output waveform of a power amplifier 130 in the fast charge mode may be represented as graph 601. This state may be a state where optimization is ended, and, as shown in graph 602, a ripple phenomenon of an RX stage may substantially correspond to 0%.

In this state, the power receiving unit 200 may enter a slow charge module (or a normal charge mode). In the slow charge mode, the power receiving unit 200 may need power for supplying a current of 200 mA to a battery. However, because a charging power for supplying a current of 800 mA to the battery is currently supplied, a Vrec value may continue increasing. That is, operation 501 of FIG. 5 may be triggered, and a duty of a modulation may decrease to 20%.

Referring to graph 603, because a time when a charging power is not supplied increases in contrast to graph 601, a ripple phenomenon may occur at the RX stage. For example, when it is assumed that a charging reference voltage is 9.2 V and a voltage ripple of 3% is in a stabilization state, as shown in graph 604, a ripple of the RX stage may occur to 5%. In this state, the power transmitting unit 100 may detect the ripple phenomenon of the RX stage. As shown in graph 605, the duty of the modulation signal may increase frequency to two times in a state where it remains 20%. Because a time interval when power is supplied is shortened according to the increase in frequency, the ripple phenomenon of the RX stage may be removed.

Figure 7:
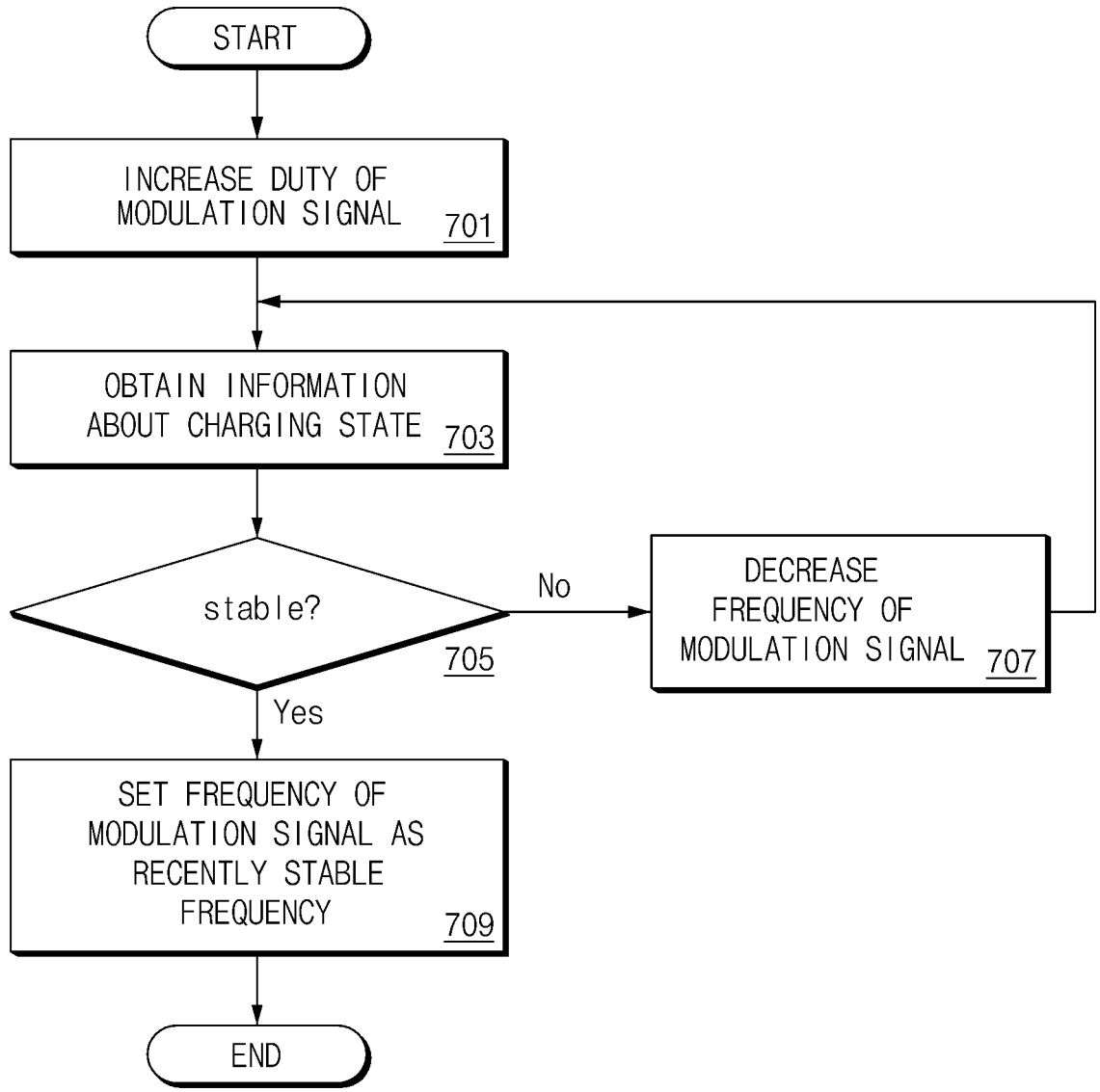
FIG. 7 illustrates a process of increasing a charging power according to an embodiment.

FIG. 7 illustrates a process of increasing a charging power according to an embodiment. In connection with FIG. 7, no description of details duplicated, corresponding, or similar to the above-mentioned description will be provided.

In operation 701, a power transmitting unit 100 may increase a duty of a modulation signal. For example, a modulation circuit 120 may increase the duty of the modulation signal from 20% to 80%.

Operation 701 may be performed when the power transmitting unit 100 receives a signal for requesting to increase a charging power from a power receiving unit 200 or recognizes that the power receiving unit 200 enters a fast charge module (or a charging mode which is relatively faster than a current charging mode). Additionally or alternatively, the power transmitting unit 100 may determine to increase a charging power based on a charging state received from the power receiving unit 200. For example, when a Vrec value received from the power receiving unit 200 continues decreasing, the power transmitting unit 100 may determine that a supplied power is less than the requested power and may increase a supplying power.

In an embodiment of FIG. 7, the power transmitting unit 100 may distinguish a pattern where the Vrec value continues decreasing and a ripple phenomenon of Vrec. When the Vrec value is reduced over several periods of the modulation signal, the power transmitting unit 100 may determine that a charging mode of the power receiving unit 200 is adjusted upwardly. However, when the reduction and recovery of the Vrec value is repeated within each period of the modulation signal, the power transmitting unit 100 may determine that the ripple phenomenon of Vrec occurs. According to an embodiment, the power transmitting unit 100 or a control circuit 150 may distinguish a first pattern in which the Vrec value increases over a plurality of periods of the modulation signal, a second pattern in which the Vrec value decreases over the plurality of periods of the modulation signal, and a third pattern in which the Vrec value is repeatedly reduced and recovered for each period of the modulation signal. When the first pattern is detected, the control circuit 150 may decrease the duty of the modulation (see FIG. 5). When the second pattern is detected, the control circuit 150 may increase the duty of the modulation signal. When the third pattern is detected, the control circuit 150 may increase a frequency of the modulation signal.

In operation 703, the power transmitting unit 100 may obtain information about a charging state via a second antenna 153. This process may correspond to operation 503 of FIG. 5. When the charging state information is obtained, in operation 705, the power transmitting unit 100 may determine whether a charging state of a battery 230 of the power receiving unit 200 is stable. This process may correspond to operation 505 of FIG. 5.

Unlike an embodiment of FIG. 5 of decreasing the duty of the modulation signal, because duty increases in an embodiment of FIG. 7, it may be determined that a charging state immediately after the duty increases is stable. In other words, when a ripple phenomenon of Vrec does not occur before the duty increases, the ripple phenomenon of Vrec does not occur after the duty increases in the same frequency condition. However, according to an embodiment, although the ripple does not occur, as described with reference to FIGS. 4A and 4B, the frequency of the modulation may be adjusted to minimize a power loss.

In operation 707, the power transmitting unit 100 may reduce the frequency of the modulation signal. For example, the modulation circuit 120 may reduce the frequency of the modulation signal by one state (e.g., at intervals of 10 kHz or 20 kHz). The width of the reduction of the modulation may be predefined. When the frequency of the modulation signal is reduced, because a period when a charging power is not supplied within one period becomes long, the power transmitting unit 100 may perform operations 703 and 705 again to determine whether the charging state is stable. When the charging state is unstable due to the reduction in frequency (e.g., when a ripple occurs), in operation 709, the power transmitting unit 100 may set the frequency of the modulation signal as a frequency which is in the last stable state. For example, when reducing the frequency of the modulation signal having a frequency of 200 kHz at intervals of 20 kHz, the charging state is stable at 120 kHz. However, when the charging state is unstable at 100 kHz, the modulation circuit 120 may fix the frequency of the modulation signal to 120 kHz.

Operation 709 may correspond to one example of a method for minimizing a power loss while maintaining the charging state in a stable state and may be replaced with another method. For example, the power transmitting unit 100 may predefine a minimum/maximum frequency value the modulation signal may have depending on the duty of the modulation signal. When the duty of the modulation signal increases and when the frequency of the modulation signal decreases to a minimum frequency value the modulation signal may have at the increased duty (although it is determined that the charging state remains stable in operation 705), the power transmitting unit 100 may not increase the frequency of the modulation signal any longer. In another example, when the duty of the modulation signal increases, the power transmitting unit 100 may immediately set a minimum frequency value the modulation signal may have at the increased duty. In this example, when a ripple does not occur, and the modulation circuit 120 may maintain the minimum frequency value. When the ripple occurs, the modulation circuit 120 may increase a frequency value until the ripple is removed (e.g., according to a process of FIG. 5). In addition, the power transmitting unit 100 may repeat operation 707 a specified number of times. For example, when the stable state remains continuous when increasing the frequency of the modulation signal over 5 times, the modulation circuit 120 may not increase the frequency of the modulation any longer.

Figure 8:
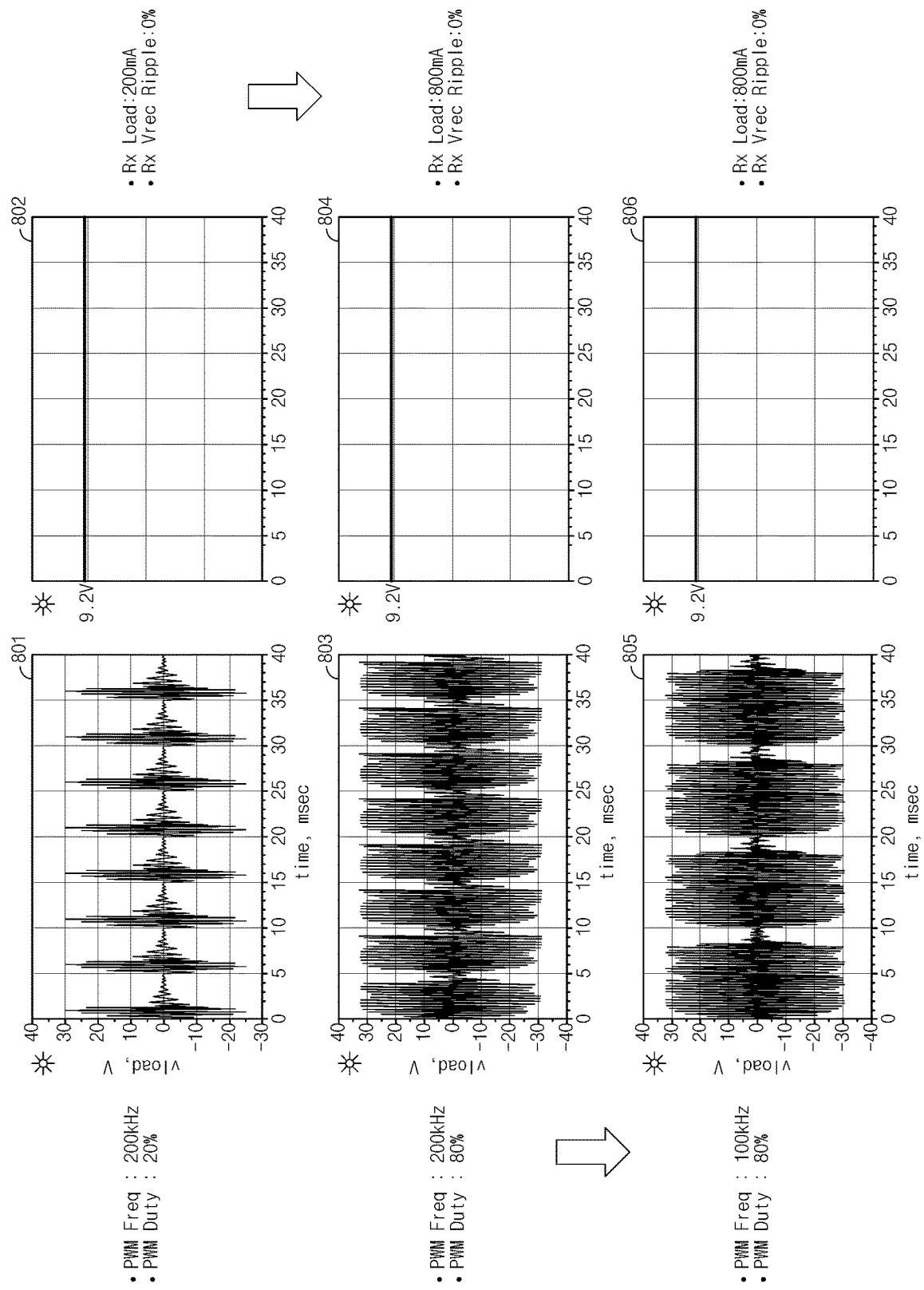
FIG. 8 illustrates an increase in a charging power and control of a frequency of a modulation signal according to an embodiment.

FIG. 8 illustrates an increase in a charging power and control of a frequency of a modulation signal according to an embodiment.

Referring to FIG. 8, to satisfy power required by a power receiving unit 200 (e.g., power for supplying a current of 200 mA to a battery), a power transmitting unit 100 may use a modulation signal with a frequency of 200 kHz and a duty of 20%. This state may be understood as a kind of slow charge mode. An output waveform of a power amplifier 130 in the slow charge mode may be represented as graph 801. This state may be a state where optimization is ended, and, as shown in graph 802, a ripple phenomenon of an RX stage may substantially correspond to 0%.

In this state, the power receiving unit 200 may enter a fast charge module (or a normal charge mode). In the fast charge mode, the power receiving unit 200 may need a charging power corresponding to a current of 800 mA. However, because a charging power corresponding to 200 mA is currently supplied, a Vrec value may continue decreasing. That is, operation 701 of FIG. 1 may be triggered, and a duty of the modulation signal may increase to 80%.

Unlike an embodiment of FIG. 6, in an embodiment of FIG. 8, referring to graph 803, because a time when a charging power is not supplied is rather more decreased, as shown in graph 804, the ripple phenomenon of the RX stage may still correspond to 0%. Contrary to performing charging with a low power, when the power transmitting unit 110 operates with a high power, it is relatively important to minimize a power loss. The heating of the power transmitting unit 110 when performing charging with the low power does not cause a problem almost to a user or for an internal component. However, heating may increase to a considerable level when the power transmitting unit 100 performs charging with a high power. Thus, it is very important to minimize heating by a power loss which may occur at a power amplifier 130. Thus, in an embodiment, only when a duty of the modulation signal has a constant value (e.g., 50%) or more, the power transmitting unit 110 may perform frequency control (reduction) after duty control. In this case, although the duty of the modulation signal increases from 20% to 40%, a modulation circuit 120 may maintain a frequency of the modulation signal to be the same before the duty control. However, in another embodiment, when the duty of the modulation signal increases, the power transmitting unit 110 may always perform frequency control (reduction).

Thus, the power transmitting unit 110 may reduce the frequency of the modulation signal in a state where it maintains the duty of the modulation. In an embodiment, for example, as shown in graph 805, the modulation circuit 120 may decrease the frequency of the modulation signal from 200 kHz to 100 kHz. The power transmitting unit 110 may perform a process (operations 703 to 709) of FIG. 7 to set an optimal frequency for maintaining a stable charging state. Finally, the charging state of the power receiving unit 200 may remain stable, as shown in graph 806.

Figure 9:
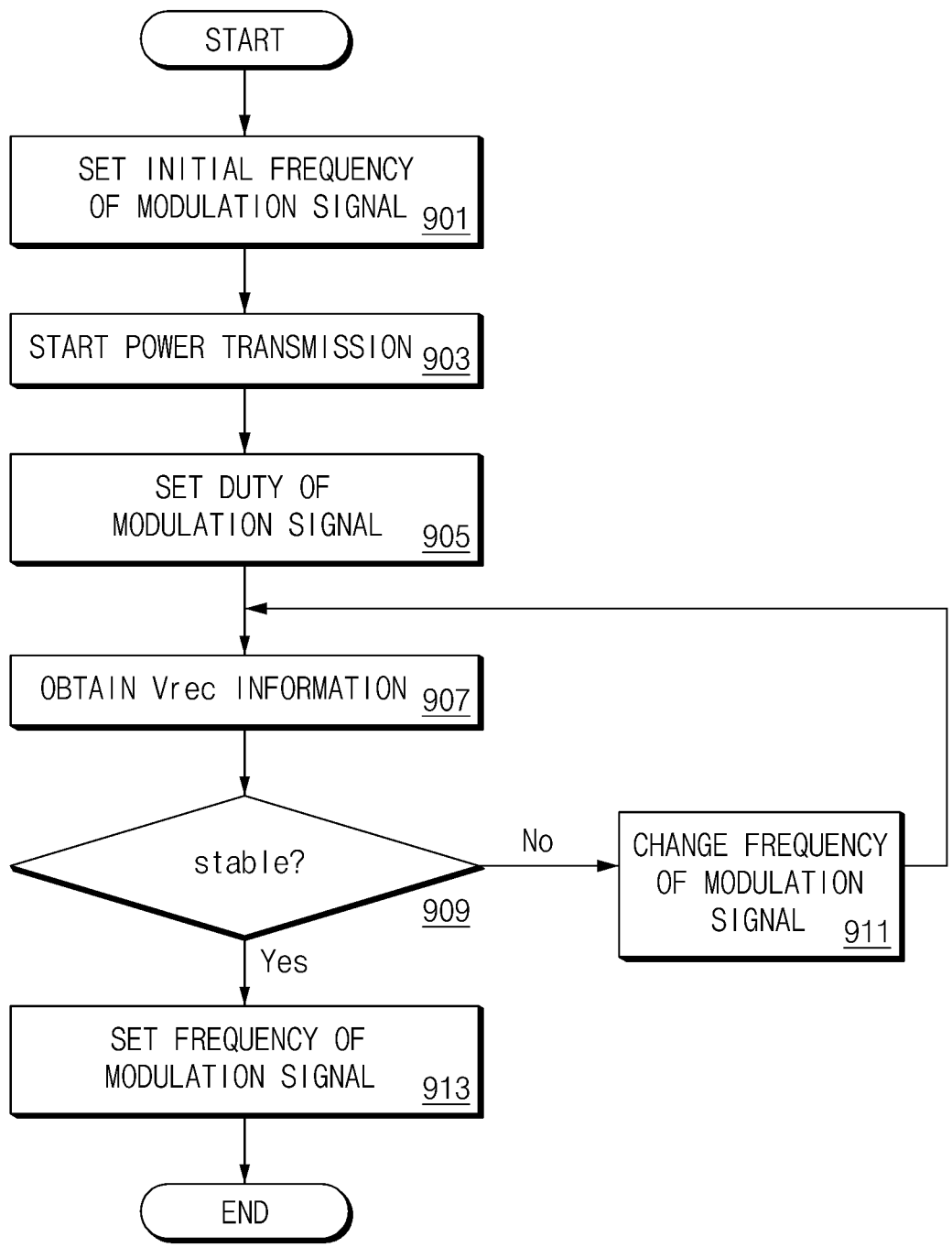
FIG. 9 illustrates an initial operation of a wireless charging system according to an embodiment.

FIG. 9 illustrates the entire process of wireless charging according to an embodiment. In connection with FIG. 9, no description of details duplicated, corresponding, or similar to the above-mentioned description will be provided.

Referring to FIG. 9, in operation 901, a power transmitting unit 100 may set an initial frequency of a modulation signal. For example, a modulation circuit 120 may generate a modulation signal with a frequency of 100 kHz or may set to generate the modulation signal.

In operation 903, the power transmitting unit 100 may start power transmission to a power receiving unit 200. Operation 903 may include a "soft start" operation described with reference to FIG. 9.

After the power transmission is started, when a constant time elapses (e.g., a PMIC of the power receiving unit 200 is enabled), in operation 905, the power transmitting unit 100 may set a duty of the modulation signal depending on a power level required by the power receiving unit 200. In an embodiment, the power transmitting unit 100 may adjust the duty of the modulation signal based on a charging stage obtained from the power receiving unit 200.

In operation 907, the power transmitting unit 100 may obtain Vrec information as information about the charging state. Operation 907 may be periodically performed. For example, the power transmitting unit 100 may obtain Vrec information at the same period as a period of the modulation signal or at a period corresponding to constant times of the period of the modulation signal, via a second antenna 153.

In operation 909, the power transmitting unit 100 may determine whether the charging state is stable. For example, when there occurs a ripple of greater than or equal to a constant level (e.g., 3%) in contrast to Vrec of the stabilization state, in operation 911, the power transmitting unit 100 may increase a frequency of the modulation signal until the charging state is stabilized. In an embodiment, when a pre-defined upper frequency limit is reached, although the charging state is sufficiently stabilized, operation 913 may be performed after operation 911.

Although it is determined that the charging state is stable in operation 909, a ripple phenomenon may occur. For example, when a ripple of less than 3% occurs, an electronic device may regard this ripple as a permissible level and may determine that the charging state is stable. As such, when the ripple within the permissible range occurs, the power transmitting unit 100 may perform an operation of decreasing the frequency of the modulation signal before fixing the frequency of the modulation signal to increase the efficiency of the power transmitting unit 100 and reduce heating. For example, the power transmitting unit 100 may maximally reduce the frequency of the modulation signal within a limit in which the ripple is maintained within the permissible level. In an embodiment, when a pre-defined lower frequency limit is reached, although the ripple is still in the permissible level, the power transmitting unit 100 may not reduce the frequency any longer to perform operation 913.

When it is determined that Vrec is stable, in operation 913, the power transmitting unit 100 may fix the frequency of the modulation signal. In this state, when the duty of the modulation signal is changed according to a change in a charging module of the power receiving unit 200 or a change in a heating state of the power transmitting unit 100, or the like, operations 907 to 913 may be performed again.

Figure 10:
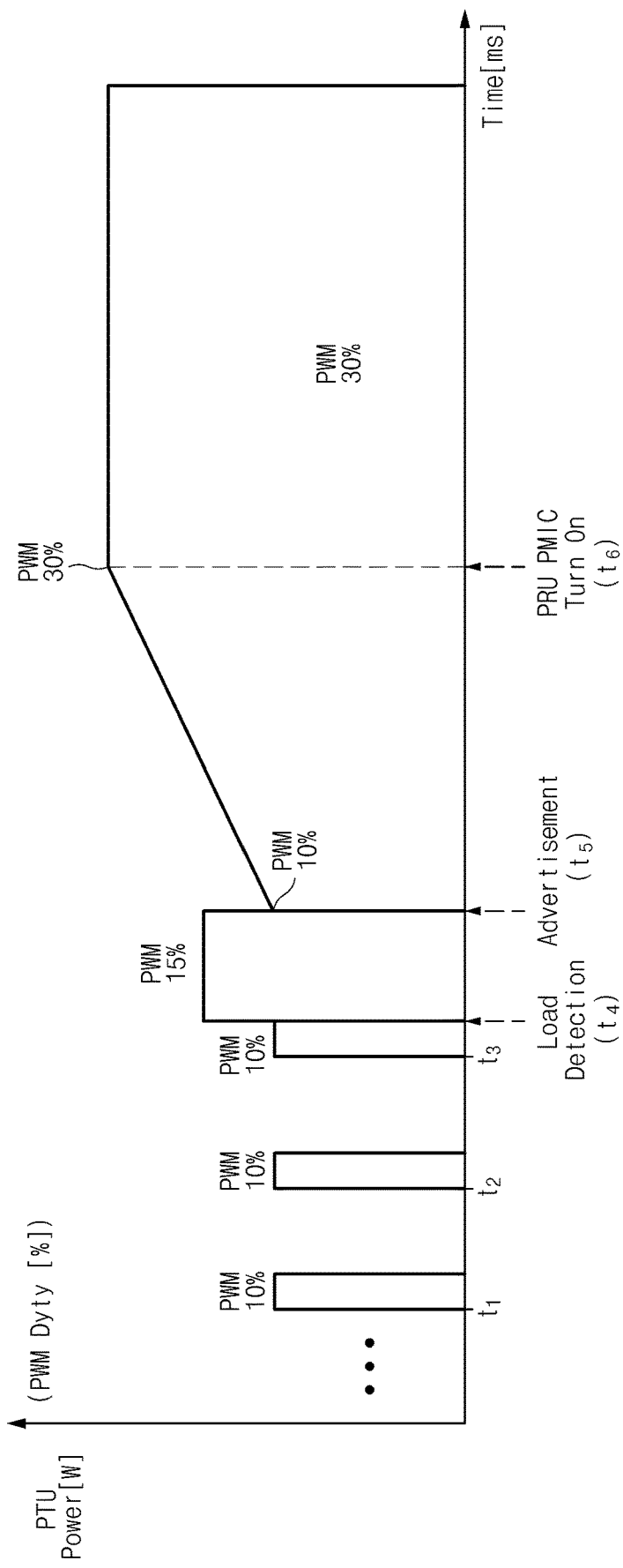
FIG. 10 illustrates the entire process of wireless charging according to an embodiment.

FIG. 10 illustrates an initial operation of a wireless charging system according to an embodiment.

FIGS. 5 to 9 may be understood as examples of controlling a modulation signal while the charging of a power receiving unit 200 is performed. Hereinafter, referring to FIG. 10, a description will be given of a method for controlling a modulation signal in an initial stage where wireless charging is started.

A power transmitting unit 100 may periodically emit a first beacon (e.g., a short beacon) to determine whether a power receiving unit 200 is located within a chargeable range of the power transmitting unit 100. For example, the power transmitting unit 100 may emit the first beacon at 10% of a maximum power at time t1, t2, or t3. For example, the power transmitting unit 100 may set a duty of a modulation signal to 10% and may emit the first beacon.

In an embodiment, the power receiving unit 200 may be detected by the first beacon emitted at time t3. When the power receiving unit 200 is detected, the power transmitting unit 100 may emit a second bean (a long beacon) at time t4 at 15% of the maximum power (e.g., set the duty of the modulation signal to 15%).

A power of the first beacon and the second beacon may be any power and may vary with settings of the power transmitting unit 100. Herein, a transmit power of the first bean and the second beacon may also be controlled by the duty of the modulation signal.

The power receiving unit 200 may transmit a message (e.g., an advertisement message) for starting charging to the power transmitting unit 100 at time t5. When receiving this message, the power transmitting unit 100 may sequentially increase power supplied to the power receiving unit 200. For example, a modulation circuit 120 may gradually increase the duty of the modulation signal from a low value (e.g., 10%) to a high value (e.g., 30%). When a power management circuit (e.g., a PMIC) of the power receiving unit 200 is enabled at t6, the power transmitting unit 100 may set the duty of the modulation signal such that power corresponding to a charging mode or power requested from the power receiving unit 200 is transmitted. In this state, when a relatively low power is requested, a process of FIG. 5 may be performed. When a relatively high power is requested, a process of FIG. 7 may be performed.

A process shown in FIG. 10, particularly, a "soft start" operation of gradually increasing the duty of the modulation between t5 and t6 may have the following advantage. A load current may substantially correspond to 0 before the PMIC of the power receiving unit 200 is enabled, and the load current may be rapidly increased after the PMIC is enabled. For example, for a typical smartphone, the load current may have 500 mA after the PMIC is enabled. Because a time when power is supplied is short when a duty ratio of the modulation signal is low, the range of a load-pull of a power amplifier 130 may be reduced. For example, when the duty is 10%, because power is supplied at only a first interval of 10% during one period of the modulation signal and power is not supplied at the rest interval of 90%, it fails to correspond to the load current which is rapidly increased after the PMIC is enabled. In this case, the initial charging may fail to be performed.

On the other hand, when the duty ratio of the modulation signal is high, because there is too much amount of power supplied before the PMIC is enabled, Vrec may become very high. When the PMIC is enabled in this state, a circuit (IC) of the power receiving unit 200 associated with charging may be broken.

Thus, as shown in FIG. 10, when the duty of the modulation signal is sequentially increased, the breakage of the circuit may be prevented while corresponding to the load current at a time when the PMIC is enabled.

The embodiment of FIG. 10 is applicable to magnetic induction wireless charging. For example, a power transmitting unit using a magnetic induction type may set a duty of a modulation to 10% and may emit an analog ping at t1 to t3. When a power receiving unit is detected at, for example, t4 by the analog ping, the duty of the modulation signal may be set to 15% and a digital ping may be transmitted to the power receiving unit. The power transmitting unit may control the modulation signal at t5 to t6 and at a time after t6 in the above-mentioned manner and may supply a charging power to the power receiving unit.

Figure 11:
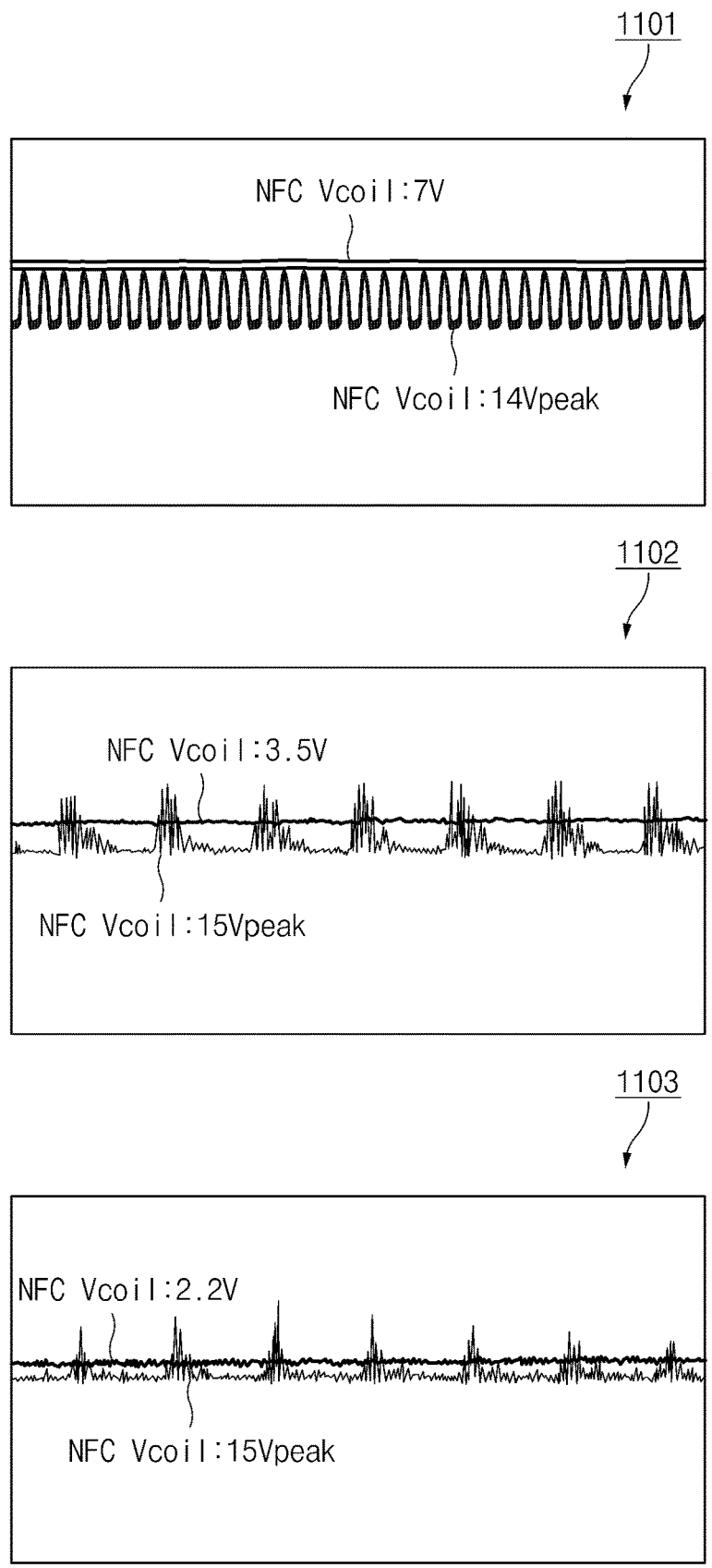
FIG. 11 illustrates a breakage prevent scenario of another system, which is capable of occurring by coupling upon wireless charging, according to an embodiment.

FIG. 11 illustrates a breakage prevent scenario of another system, which is capable of occurring by coupling upon wireless charging, according to an embodiment.

For resonant wireless charging, a frequency of 6.78 MHz for wireless charging may be used following the AW4P standard. Thus, a communication system which uses a similar frequency band or uses a frequency corresponding to a harmonic component (e.g., times of 6.78 MHz) may be influenced by a signal induced in a charging coil of a power transmitting unit 100. For example, an NFC coil using a frequency of 13.56 MHz may be coupled with a transmit coil 141 of the power transmitting unit. When voltage occurs on the NFC coil by the power transmitting unit 100 and when the voltage becomes a constant voltage (e.g., 4 V) or more, an NFC chips may increase in temperature and an NFC card may be damaged.

A user of an electronic device, such as a smartphone, may put and use a credit card or the like loaded with an NFC chip in a case of the electronic device. When wireless charging is started, the electronic device (a power receiving unit 200) may output a message for removing the NFC card by means of its display, speaker, or the like. However, the constant voltage or more may be induced in the NFC circuit with only power supplied by a second beacon (e.g., a long beacon) described with reference to FIG. 9. In this case, before the wireless charging is started, the NFC cad may be damaged. For example, as shown in graph 1101, when the long beacon is emitted with a power of 100% from the currently commercialized power transmitting unit, a voltage of about 7 V may be loaded onto the NFC circuit and this may lead to the damage of the NFC circuit.

Thus, according to an embodiment, as shown in graph 1102 or 1103, the power transmitting unit 100 may set a duty of a modulation signal to 25% or 10% to be low when emitting the long beacon. In other words, the modulation circuit 120 may generate the modulation signal such that the duty of the modulation signal applied when emitting the second beacon becomes a specified threshold or less. In this case, on average, a voltage of 3.5 V or 2.2 V may be loaded onto the NFC circuit. Although a voltage of 15 V is loaded onto the NFC circuit in a moment, because a time when power is not transmitted corresponds to 75% or 90% of one period of the modulation signal, this may fail to lead to an increase in temperature, which damages the NFC circuit. Thus, the power transmitting unit 100 may set the duty of the modulation signal to less than or equal to a specified value when emitting the long beacon (a second beacon). After receiving the long beacon, when entering a power transfer mode, the power receiving unit 200 may detect the NFC or may output an information message associated with the breakage of the NFC irrespective of whether the NFC is detected.

In an embodiment, the power transmitting unit 10 or 100 may control an output power for an electronic device having the NFC or another wireless communication and charging system. For example, the power transmitting unit 10 may receive Vrec of the NFC circuit via a communication circuit (e.g., a second communication circuit 13b of FIG. 1A) and may set the duty of the modulation signal based on the received NFC Vrec information to be low such that the breakage of the NFC circuit does not occur.

Figure 12:
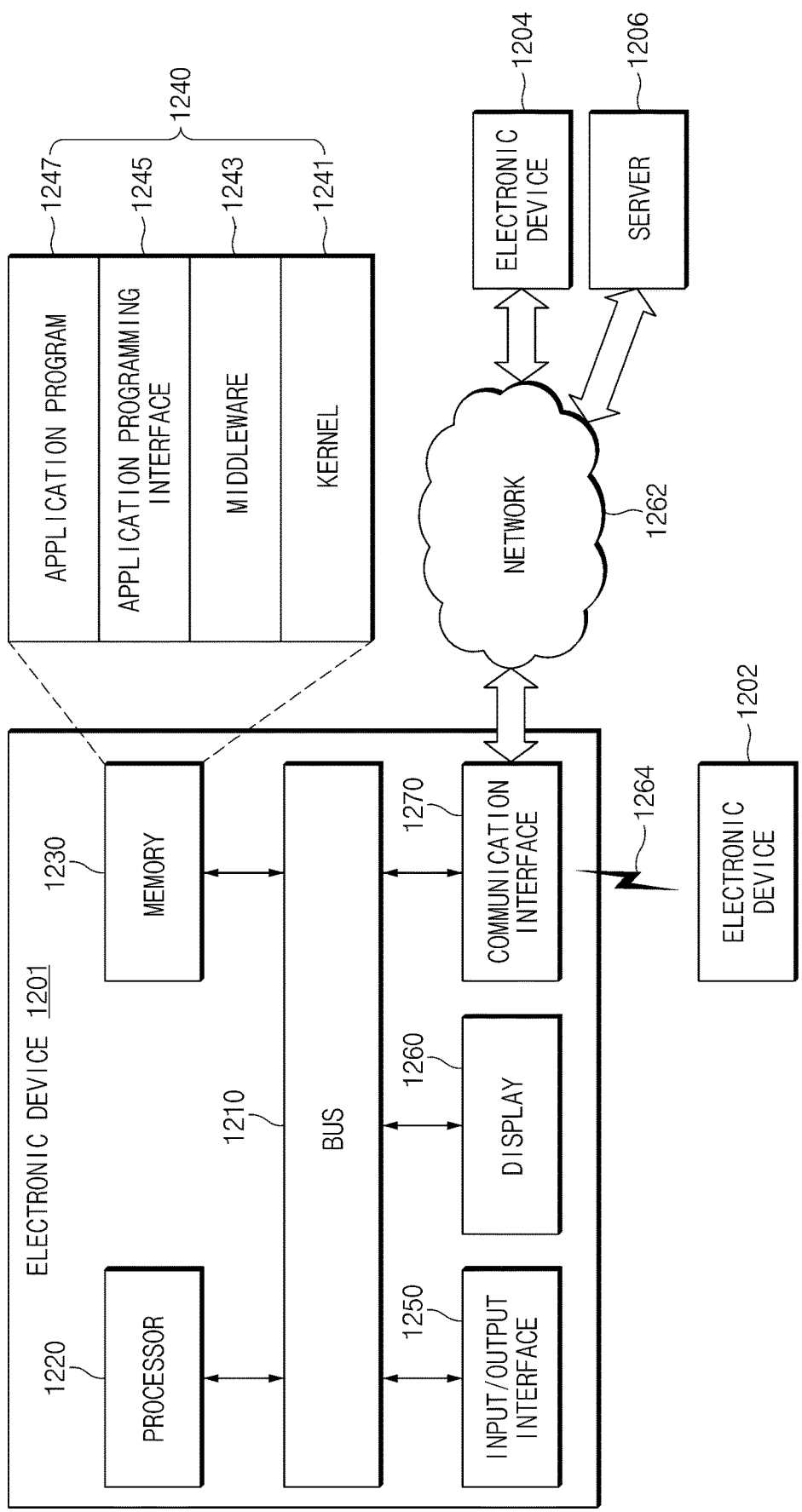
FIG. 12 illustrates an electronic device in a network environment according to various embodiments of the present disclosure.
Figure 13:
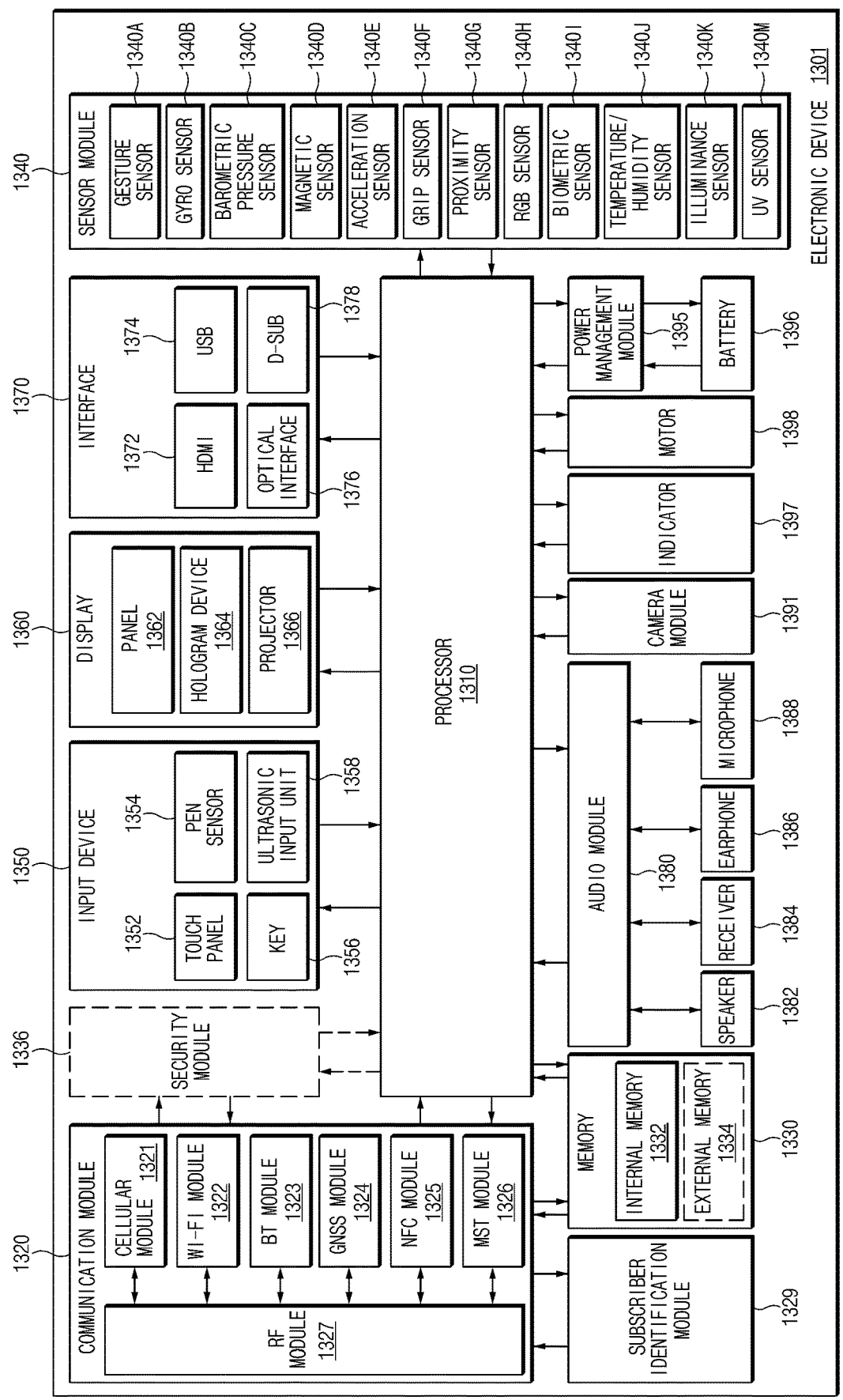
FIG. 13 is a block diagram of an electronic device according to various embodiments of the present disclosure.

FIGS. 12 and 13 illustrate examples of hardware/software applicable to the power transmitting unit or the power receiving unit 200 according to an embodiment.

FIG. 12 illustrates an electronic device in a network environment, according to various embodiments.

Referring to FIG. 12, according to various embodiments, an electronic device 1201, a first electronic device 1202, a second electronic device 1204, or a server 1206 may be connected with each other over a network 1162 or local wireless communication 1264. The electronic device 1201 may include a bus 1110, a processor 1220, a memory 1230, an input/output interface 1250, a display 1260, and a communication interface 1270. According to an embodiment, the electronic device 1201 may not include at least one of the above-described elements or may further include other element(s).

For example, the bus 1110 may interconnect the above-described elements 1210 to 1270 and may include a circuit for conveying communications (e.g., a control message and/or data) among the above-described elements.

The processor 1220 may include one or more of a central processing unit (CPU), an application processor (AP), or a communication processor (CP). For example, the processor 1220 may perform an arithmetic operation or data processing associated with control and/or communication of at least other elements of the electronic device 1201.

The memory 1230 may include a volatile and/or nonvolatile memory. For example, the memory 1230 may store instructions or data associated with at least one other element(s) of the electronic device 1201. According to an embodiment, the memory 1230 may store software and/or a program 1240. The program 1240 may include, for example, a kernel 1241, a middleware 1243, an application programming interface (API) 1245, and/or an application program (or "an application") 1247. At least a part of the kernel 1241, the middleware 1243, or the API 1245 may be referred to as an "operating system (OS)".

For example, the kernel 1241 may control or manage system resources (e.g., the bus 1110, the processor 1220, the memory 1230, and the like) that are used to execute operations or functions of other programs (e.g., the middleware 1243, the API 1245, and the application program 1247). Furthermore, the kernel 1241 may provide an interface that allows the middleware 1243, the API 1245, or the application program 1247 to access discrete elements of the electronic device 1201 so as to control or manage system resources.

The middleware 1243 may perform, for example, a mediation role such that the API 1245 or the application program 1247 communicates with the kernel 1241 to exchange data.

Furthermore, the middleware 1243 may process one or more task requests received from the application program 1247 according to a priority. For example, the middleware 1243 may assign the priority, which makes it possible to use a system resource (e.g., the bus 1110, the processor 1220, the memory 1230, or the like) of the electronic device 1201, to at least one of the application program 1247. For example, the middleware 1243 may process the one or more task requests according to the priority assigned to the at least one, which makes it possible to perform scheduling or load balancing on the one or more task requests.

The API 1245 may be, for example, an interface through which the application program 1247 controls a function provided by the kernel 1241 or the middleware 1243, and may include, for example, at least one interface or function (e.g., an instruction) for a file control, a window control, image processing, a character control, or the like.

The input/output interface 1250 may play a role, for example, an interface which transmits an instruction or data input from a user or another external device, to other element(s) of the electronic device 1201. Furthermore, the input/output interface 1250 may output an instruction or data, received from other element(s) of the electronic device 1201, to a user or another external device.

The display 1260 may include, for example, a liquid crystal display (LCD), a light-emitting diode (LED) display, an organic LED (OLED) display, a microelectromechanical systems (MEMS) display, or an electronic paper display. The display 1260 may display, for example, various contents (e.g., a text, an image, a video, an icon, a symbol, and the like) to a user. The display 1260 may include a touch screen and may receive, for example, a touch, gesture, proximity, or hovering input using an electronic pen or a part of a user's body.

For example, the communication interface 1270 may establish communication between the electronic device 1201 and an external device (e.g., the first electronic device 1202, the second electronic device 1204, or the server 1206). For example, the communication interface 1270 may be connected to the network 1262 over wireless communication or wired communication to communicate with the external device (e.g., the second electronic device 1204 or the server 1206).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the local wireless communication 1264. The local wireless communication 1264 may include at least one of wireless fidelity (Wi-Fi), light fidelity (Li-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1201 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1262 may include at least one of telecommunications networks, for example, a computer network (e.g., LAN or WAN), an Internet, or a telephone network.

Each of the first and second electronic devices 1202 and 1204 may be a device of which the type is different from or the same as that of the electronic device 1201. According to an embodiment, the server 1206 may include a group of one or more servers. According to various embodiments, all or a portion of operations that the electronic device 1201 will perform may be executed by another or plural electronic devices (e.g., the first electronic device 1202, the second electronic device 1204 or the server 1206). According to an embodiment, in the case where the electronic device 1201 executes any function or service automatically or in response to a request, the electronic device 1201 may not perform the function or the service internally, but, alternatively additionally, it may request at least a portion of a function associated with the electronic device 1201 at other electronic device (e.g., the electronic device 1202 or 1204 or the server 1206). The other electronic device may execute the requested function or additional function and may transmit the execution result to the electronic device 1201. The electronic device 1201 may provide the requested function or service using the received result or may additionally process the received result to provide the requested function or service. To this end, for example, cloud computing, distributed computing, or client-server computing may be used.

FIG. 13 illustrates a block diagram of an electronic device, according to various embodiments.

Referring to FIG. 13, an electronic device 1301 may include, for example, all or a part of the electronic device 1201 illustrated in FIG. 12. The electronic device 1301 may include one or more processors (e.g., an application processor (AP)) 1310, a communication module 1320, a subscriber identification module 1329, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may drive, for example, an operating system (OS) or an application to control a plurality of hardware or software elements connected to the processor 1310 and may process and compute a variety of data. For example, the processor 1310 may be implemented with a System on Chip (SoC). According to an embodiment, the processor 1310 may further include a graphic processing unit (GPU) and/or an image signal processor. The processor 1310 may include at least a part (e.g., a cellular module 1321) of elements illustrated in FIG. 13. The processor 1310 may load an instruction or data, which is received from at least one of other elements (e.g., a nonvolatile memory), into a volatile memory and process the loaded instruction or data. The processor 1310 may store a variety of data in the nonvolatile memory.

The communication module 1320 may be configured the same as or similar to the communication interface 1270 of FIG. 12. The communication module 1320 may include the cellular module 1321, a Wi-Fi module 1322, a Bluetooth (BT) module 1323, a GNSS module 1324 (e.g., a GPS module, a Glonass module, a Beidou module, or a Galileo module), a near field communication (NFC) module 1325, a MST module 1326 and a radio frequency (RF) module 1327.

The cellular module 1321 may provide, for example, voice communication, video communication, a character service, an Internet service, or the like over a communication network. According to an embodiment, the cellular module 1321 may perform discrimination and authentication of the electronic device 1301 within a communication network by using the subscriber identification module (e.g., a SIM card) 1329. According to an embodiment, the cellular module 1321 may perform at least a portion of functions that the processor 1310 provides. According to an embodiment, the cellular module 1321 may include a communication processor (CP).

Each of the Wi-Fi module 1322, the BT module 1323, the GNSS module 1324, the NFC module 1325, or the MST module 1326 may include a processor for processing data exchanged through a corresponding module, for example. According to an embodiment, at least a part (e.g., two or more) of the cellular module 1321, the Wi-Fi module 1322, the BT module 1323, the GNSS module 1324, the NFC module 1325, or the MST module 1326 may be included within one Integrated Circuit (IC) or an IC package.

For example, the RF module 1327 may transmit and receive a communication signal (e.g., an RF signal). For example, the RF module 1327 may include a transceiver, a power amplifier module (PAM), a frequency filter, a low noise amplifier (LNA), an antenna, or the like. According to another embodiment, at least one of the cellular module 1321, the Wi-Fi module 1322, the BT module 1323, the GNSS module 1324, the NFC module 1325, or the MST module 1326 may transmit and receive an RF signal through a separate RF module.

The subscriber identification module 1329 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1330 (e.g., the memory 1230) may include an internal memory 1332 or an external memory 1334. For example, the internal memory 1332 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1334 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1334 may be operatively and/or physically connected to the electronic device 1301 through various interfaces.

A security module 1336 may be a module that includes a storage space of which a security level is higher than that of the memory 1330 and may be a circuit that guarantees safe data storage and a protected execution environment. The security module 1336 may be implemented with a separate circuit and may include a separate processor. For example, the security module 1336 may be in a smart chip or a secure digital (SD) card, which is removable, or may include an embedded secure element (eSE) embedded in a fixed chip of the electronic device 1301. Furthermore, the security module 1336 may operate based on an operating system (OS) that is different from the OS of the electronic device 1301. For example, the security module 1336 may operate based on java card open platform (JCOP) OS.

The sensor module 1340 may measure, for example, a physical quantity or may detect an operation state of the electronic device 1301. The sensor module 1340 may convert the measured or detected information to an electric signal. For example, the sensor module 1340 may include at least one of a gesture sensor 1340A, a gyro sensor 1340B, a barometric pressure sensor 1340C, a magnetic sensor 1340D, an acceleration sensor 1340E, a grip sensor 1340F, the proximity sensor 1340G, a color sensor 1340H (e.g., red, green, blue (RGB) sensor), a biometric sensor 1340I, a temperature/humidity sensor 1340J, an illuminance sensor 1340K, or an UV sensor 1340M. Although not illustrated, additionally or generally, the sensor module 1340 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling at least one or more sensors included therein. According to an embodiment, the electronic device 1301 may further include a processor that is a part of the processor 1310 or independent of the processor 1310 and is configured to control the sensor module 1340. The processor may control the sensor module 1340 while the processor 1310 remains at a sleep state.

The input device 1350 may include, for example, a touch panel 1352, a (digital) pen sensor 1354, a key 1356, or an ultrasonic input unit 1358. For example, the touch panel 1352 may use at least one of capacitive, resistive, infrared and ultrasonic detecting methods. Also, the touch panel 1352 may further include a control circuit. The touch panel 1352 may further include a tactile layer to provide a tactile reaction to a user.

The (digital) pen sensor 1354 may be, for example, a part of a touch panel or may include an additional sheet for recognition. The key 1356 may include, for example, a physical button, an optical key, or a keypad. The ultrasonic input device 1358 may detect (or sense) an ultrasonic signal, which is generated from an input device, through a microphone (e.g., a microphone 1388) and may check data corresponding to the detected ultrasonic signal.

The display 1360 (e.g., the display 1260) may include a panel 1362, a hologram device 1364, or a projector 1366. The panel 1362 may be the same as or similar to the display 1260 illustrated in FIG. 12. The panel 1362 may be implemented, for example, to be flexible, transparent or wearable. The panel 1362 and the touch panel 1352 may be integrated into a single module. The hologram device 1364 may display a stereoscopic image in a space using a light interference phenomenon. The projector 1366 may project light onto a screen so as to display an image. For example, the screen may be arranged in the inside or the outside of the electronic device 1301. According to an embodiment, the display 1360 may further include a control circuit for controlling the panel 1362, the hologram device 1364, or the projector 1366.

The interface 1370 may include, for example, a high-definition multimedia interface (HDMI) 1372, a universal serial bus (USB) 1374, an optical interface 1376, or a D-subminiature (D-sub) 1378. The interface 1370 may be included, for example, in the communication interface 1270 illustrated in FIG. 12. Additionally or generally, the interface 1370 may include, for example, a mobile high definition link (MHL) interface, a SD card/multi-media card (MMC) interface, or an infrared data association (IrDA) standard interface.

The audio module 1380 may convert a sound and an electric signal in dual directions. At least a part of the audio module 1380 may be included, for example, in the input/output interface 1250 illustrated in FIG. 12. The audio module 1380 may process, for example, sound information that is input or output through a speaker 1382, a receiver 1384, an earphone 1386, or the microphone 1388.

For example, the camera module 1391 may shoot a still image or a video. According to an embodiment, the camera module 1391 may include at least one or more image sensors (e.g., a front sensor or a rear sensor), a lens, an image signal processor (ISP), or a flash (e.g., an LED or a xenon lamp).

The power management module 1395 may manage, for example, power of the electronic device 1301. According to an embodiment, a power management integrated circuit (PMIC), a charger IC, or a battery or fuel gauge may be included in the power management module 1395. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1396 and a voltage, current or temperature thereof while the battery is charged. The battery 1396 may include, for example, a rechargeable battery and/or a solar battery.

The indicator 1397 may display a specific state of the electronic device 1301 or a part thereof (e.g., the processor 1310), such as a booting state, a message state, a charging state, and the like. The motor 1398 may convert an electrical signal into a mechanical vibration and may generate the following effects: vibration, haptic, and the like. Although not illustrated, a processing device (e.g., a GPU) for supporting a mobile TV may be included in the electronic device 1301. The processing device for supporting the mobile TV may process media data according to the standards of Digital Multimedia Broadcasting (DMB), digital video broadcasting (DVB), MediaFLO™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 14:
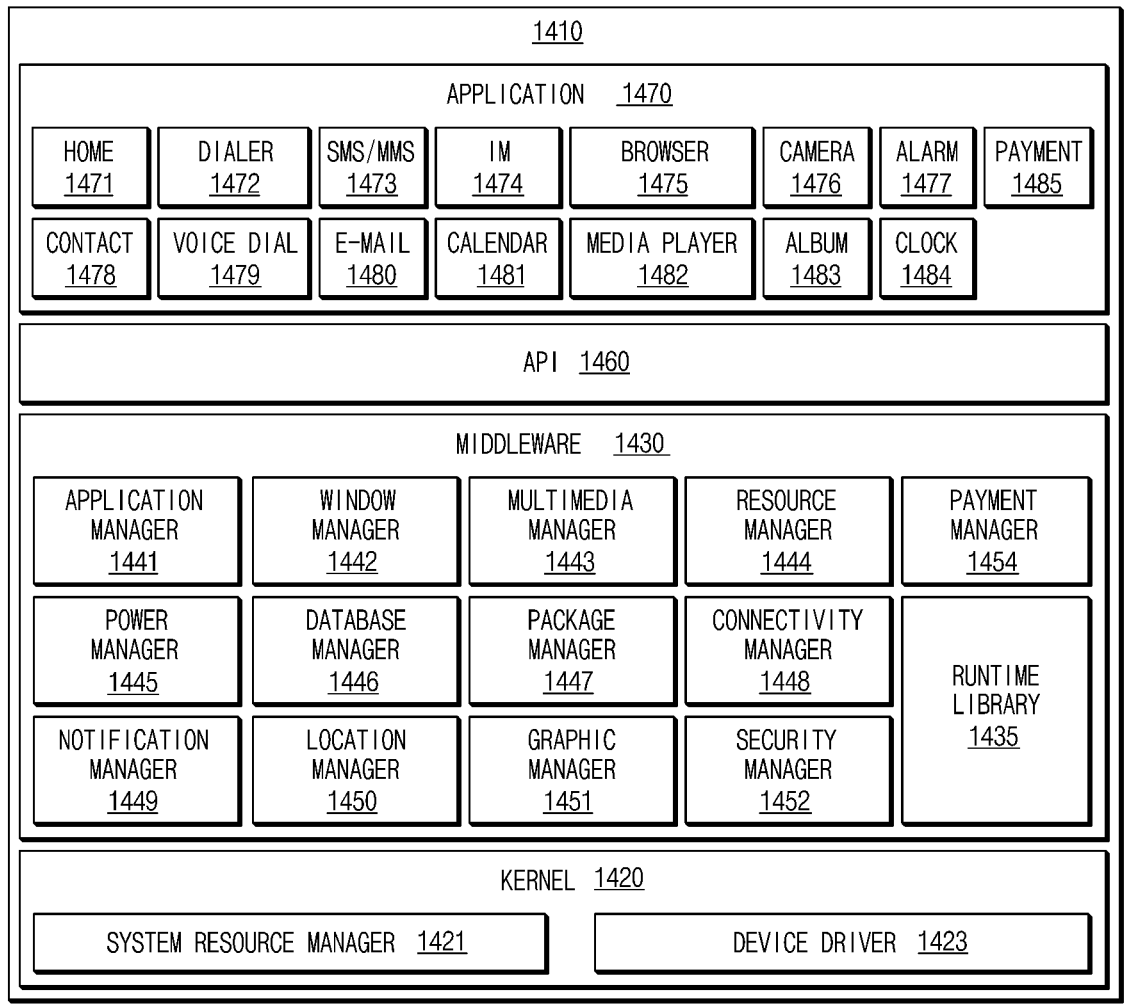
FIG. 14 is a block diagram of a program module according to various embodiments of the present disclosure.

FIG. 14 illustrates a block diagram of a program module, according to various embodiments.

According to an embodiment, a program module 1410 (e.g., the program 1240) may include an operating system (OS) to control resources associated with an electronic device (e.g., the electronic device 1201), and/or diverse applications (e.g., the application program 1247) driven on the OS. The OS may be, for example, Android, iOS, Windows, Symbian, or Tizen.

The program module 1410 may include a kernel 1420, a middleware 1430, an application programming interface (API) 1460, and/or an application 1470. At least a portion of the program module 1410 may be preloaded on an electronic device or may be downloadable from an external electronic device (e.g., the first electronic device 1202, the second electronic device 1204, the server 1206, or the like).

The kernel 1420 (e.g., the kernel 1241) may include, for example, a system resource manager 1421 or a device driver 1423. The system resource manager 1421 may control, allocate, or retrieve system resources. According to an embodiment, the system resource manager 1421 may include a process managing unit, a memory managing unit, a file system managing unit, or the like. The device driver 1423 may include, for example, a display driver, a camera driver, a Bluetooth driver, a shared memory driver, a USB driver, a keypad driver, a Wi-Fi driver, an audio driver, or an inter-process communication (IPC) driver.

The middleware 1430 may provide, for example, a function that the application 1470 needs in common, or may provide diverse functions to the application 1470 through the API 1460 to allow the application 1470 to efficiently use limited system resources of the electronic device. According to an embodiment, the middleware 1430 (e.g., the middleware 1243) may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, a security manager 1452, or a payment manager 1454.

The runtime library 1435 may include, for example, a library module that is used by a compiler to add a new function through a programming language while the application 1470 is being executed. The runtime library 1435 may perform input/output management, memory management, or capacities about arithmetic functions.

The application manager 1441 may manage, for example, a life cycle of at least one application of the application 1470. The window manager 1442 may manage a graphic user interface (GUI) resource that is used in a screen. The multimedia manager 1443 may identify a format necessary for playing diverse media files, and may perform encoding or decoding of media files by using a codec suitable for the format. The resource manager 1444 may manage resources such as a storage space, memory, or source code of at least one application of the application 1470.

The power manager 1445 may operate, for example, with a basic input/output system (BIOS) to manage capacity of a battery, temperature, or power, and may determine or provide power information for an operation of an electronic device by using the corresponding information from among the pieces of information. The database manager 1446 may generate, search for, or modify database that is to be used in at least one application of the application 1470. The package manager 1447 may install or update an application that is distributed in the form of package file.

The connectivity manager 1448 may manage, for example, wireless connection such as Wi-Fi or Bluetooth. The notification manager 1449 may display or notify an event such as arrival message, appointment, or proximity notification in a mode that does not disturb a user. The location manager 1450 may manage location information about an electronic device. The graphic manager 1451 may manage a graphic effect that is provided to a user, or manage a user interface relevant thereto. The security manager 1452 may provide a general security function necessary for system security, user authentication, or the like. According to an embodiment, in the case where an electronic device (e.g., the electronic device 1201) includes a telephony function, the middleware 1430 may further include a telephony manager for managing a voice or video call function of the electronic device.

The middleware 1430 may include a middleware module that combines diverse functions of the above-described elements. The middleware 1430 may provide a module specialized to each OS kind to provide differentiated functions. Additionally, the middleware 1430 may dynamically remove a part of the preexisting elements or may add new elements thereto.

The API 1460 (e.g., the API 1245) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 1470 (e.g., the application program 1247) may include, for example, one or more applications capable of providing functions for a home 1471, a dialer 1472, an SMS/MMS 1473, an instant message (IM) 1474, a browser 1475, a camera 1476, an alarm 1477, a contact 1478, a voice dial 1479, an e-mail 1480, a calendar 1481, a media player 1482, an album 1483, a timepiece 1484, a payment 1485, health care (e.g., measuring an exercise quantity, blood sugar, or the like) or offering of environment information (e.g., information of barometric pressure, humidity, temperature, or the like).

According to an embodiment, the application 1470 may include an application (hereinafter referred to as "information exchanging application" for descriptive convenience) to support information exchange between an electronic device (e.g., the electronic device 1201) and an external electronic device (e.g., the first electronic device 1202 or the second electronic device 1204). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1470 may include an application (e.g., a health care application of a mobile medical device) that is assigned in accordance with an attribute of an external electronic device. According to an embodiment, the application 1470 may include an application that is received from an external electronic device (e.g., the first electronic device 1202, the second electronic device 1204, or the server 1206).

According to an embodiment, the application 1470 may include a preloaded application or a third party application that is downloadable from a server. The names of elements of the program module 1410 according to the embodiment may be modifiable depending on kinds of operating systems.

According to various embodiments, at least a portion of the program module 1410 may be implemented by software, firmware, hardware, or a combination of two or more thereof. At least a portion of the program module 1410 may be implemented (e.g., executed), for example, by the processor (e.g., the processor 1310). At least a portion of the program module 1410 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor (e.g., the processor 1220), may cause the one or more processors to perform a function corresponding to the instruction. The computer-readable storage media, for example, may be the memory 1230.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A power transmitting unit, comprising:
   a signal generator configured to generate a signal of a first frequency band for wireless charging;
   a power generation circuit configured to generate a modulation signal for modulating the signal of the first frequency band generated by the signal generator, and amplify a transmit power of the signal of the first frequency band based on voltage supplied from outside of the power transmitting unit;
   a power transmission circuit configured to transmit the amplified transmit power to a power receiving unit via a first antenna;
   a second antenna configured to receive information about a charging state from the power receiving unit through a second frequency band;
   a control circuit configured to control a duty cycle and frequency of the modulation signal based on the charging state; and
   responsive to increasing the duty cycle of the modulation signal, decreasing the frequency of the modulation signal.

2. The power transmitting unit of claim 1, further comprising:
   a switching circuit located between the power generation circuit and the signal generator,
   wherein the switching circuit is configured to perform an on/off operation depending on the modulation signal.

3. The power transmitting unit of claim 1, wherein the power generation circuit comprises a modulation circuit and a power amplifier,
   wherein the modulation circuit is configured to generate the modulation signal, and
   wherein the power amplifier is configured to amplify the transmit power of the signal of the first frequency band modulated by the modulation signal.

4. The power transmitting unit of claim 1, wherein the charging state comprises a voltage value of a rectifier capacitor of the power receiving unit.

5. The power transmitting unit of claim 4, wherein the control circuit is configured to:
   when the voltage value decreases over a plurality of periods of the modulation signal, increase the duty cycle of the modulation signal.

6. The power transmitting unit of claim 4, wherein the control circuit is configured to:
when the voltage value increases over a plurality of periods of the modulation signal, decrease the duty cycle of the modulation signal.

7. The power transmitting unit of claim 6, wherein the control circuit is configured to:
when the duty cycle of the modulation signal is decreased, determine whether there occurs a ripple of the voltage value of the rectifier capacitor; and
when the ripple occurs, increase the frequency of the modulation signal.

8. The power transmitting unit of claim 1, wherein the control circuit is configured to:
when it is determined that the charging state is unstable, control the power generation circuit to increase the frequency of the modulation signal.

9. The power transmitting unit of claim 1, wherein the control circuit is configured to:
when it is determined that the charging state is stable, control the power generation circuit to decrease the frequency of the modulation signal.

10. The power transmitting unit of claim 1, wherein the power transmission circuit is configured to:
emit a first beacon and detect the power receiving unit; and
when the power receiving unit is detected, emit a second beacon having power higher than the first beacon, and
wherein the power generation circuit is configured to:
transmit the transmit power to the power transmission circuit while continuing increasing the duty cycle of the modulation signal from a first rate to a second rate during a constant time interval after the second beacon is emitted.

11. The power transmitting unit of claim 10, wherein the power generation circuit is configured to generate the modulation signal having the duty cycle of less than or equal to a specified threshold when the second beacon is emitted.

12. A power transmitting method in a power transmitting unit, the method comprising:
generating a signal of a first frequency band for wireless charging;
generating a modulation signal for modulating the signal of the first frequency band;
amplifying a transmit power of the signal of the first frequency band based on a constant voltage supplied from the outside of the power transmitting unit;
transmitting the amplified transmit power to a power receiving unit;
receiving information about a charging state from the power receiving unit;
controlling a duty cycle and frequency of the modulation signal based on the charging state; and
responsive to increasing the duty cycle of the modulation signal, decreasing the frequency of the modulation signal.

13. The method of claim 12, wherein the controlling of the duty and frequency of the modulation signal based on the charging state comprises:
decreasing the duty of the modulation signal;
determining whether the charging state is stable in response to the decrease in the duty; and
when it is determined that the charging state is unstable, increasing the frequency of the modulation signal while maintaining the decreased duty of the modulation signal.

14. The method of claim 12, wherein the controlling of the duty and frequency of the modulation signal based on the charging state comprises:
increasing the duty of the modulation signal;
determining whether the charging state is stable in response to the increase in the duty; and
when it is determined that the charging state is stable, decreasing the frequency of the modulation signal while maintaining the increased duty of the modulation signal.

* * * * *